(12) United States Patent
Crawley et al.

(10) Patent No.: US 7,706,112 B2
(45) Date of Patent: Apr. 27, 2010

(54) ACTIVE CLAMP PROTECTION DEVICE

(75) Inventors: Philip John Crawley, Sacramento, CA (US); Sajol Ghoshal, El Dorado Hills, CA (US)

(73) Assignee: Akros Silicon Inc., Folsom, CA (US)

( * ) Notice: Subject to any disclaimer, the term of this patent is extended or adjusted under 35 U.S.C. 154(b) by 523 days.

(21) Appl. No.: 11/613,156

(22) Filed: Dec. 19, 2006

(65) Prior Publication Data

US 2008/0144241 A1 Jun. 19, 2008

(51) Int. Cl.
*H02H 3/22* (2006.01)
(52) U.S. Cl. .......................................... 361/56; 361/111
(58) Field of Classification Search ................... 361/56, 361/111, 91.1
See application file for complete search history.

(56) References Cited

U.S. PATENT DOCUMENTS

| 5,729,418 | A | * | 3/1998 | Lei | 361/58 |
| 5,742,463 | A | * | 4/1998 | Harris | 361/88 |
| 6,714,393 | B2 | * | 3/2004 | Nostrand | 361/58 |
| 7,394,638 | B2 | * | 7/2008 | Ahmad et al. | 361/111 |

* cited by examiner

*Primary Examiner*—Danny Nguyen

(57) ABSTRACT

An active clamp device electrically couples first and second nodes in respective first and second supply domains referenced to ground potentials that can be different. The active clamp device comprises first and second active devices controlled by signals respectively referenced to the first and second supply domains that create a short-circuit or low impedance connection between the first and second nodes in normal operation and drive impedance between the first and second nodes high in response to a transient event.

48 Claims, 16 Drawing Sheets

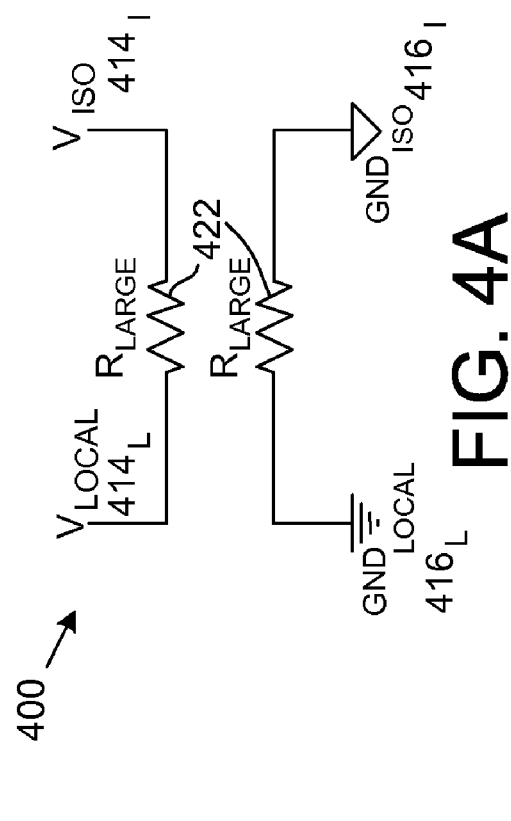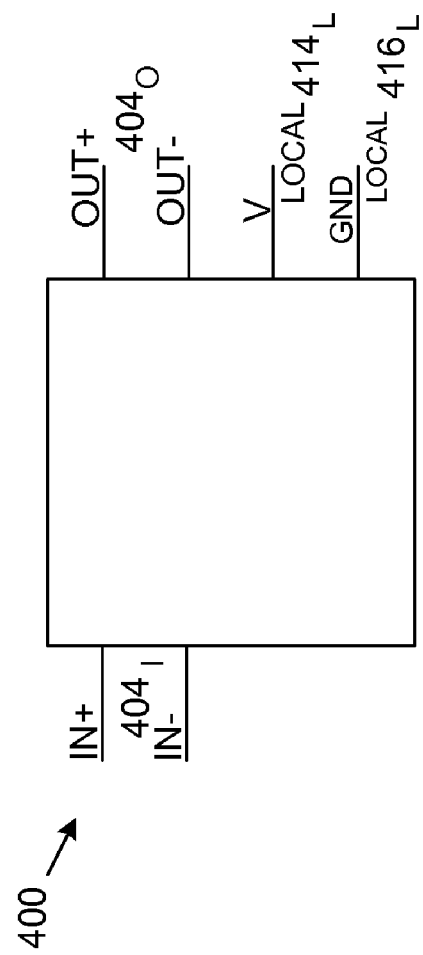

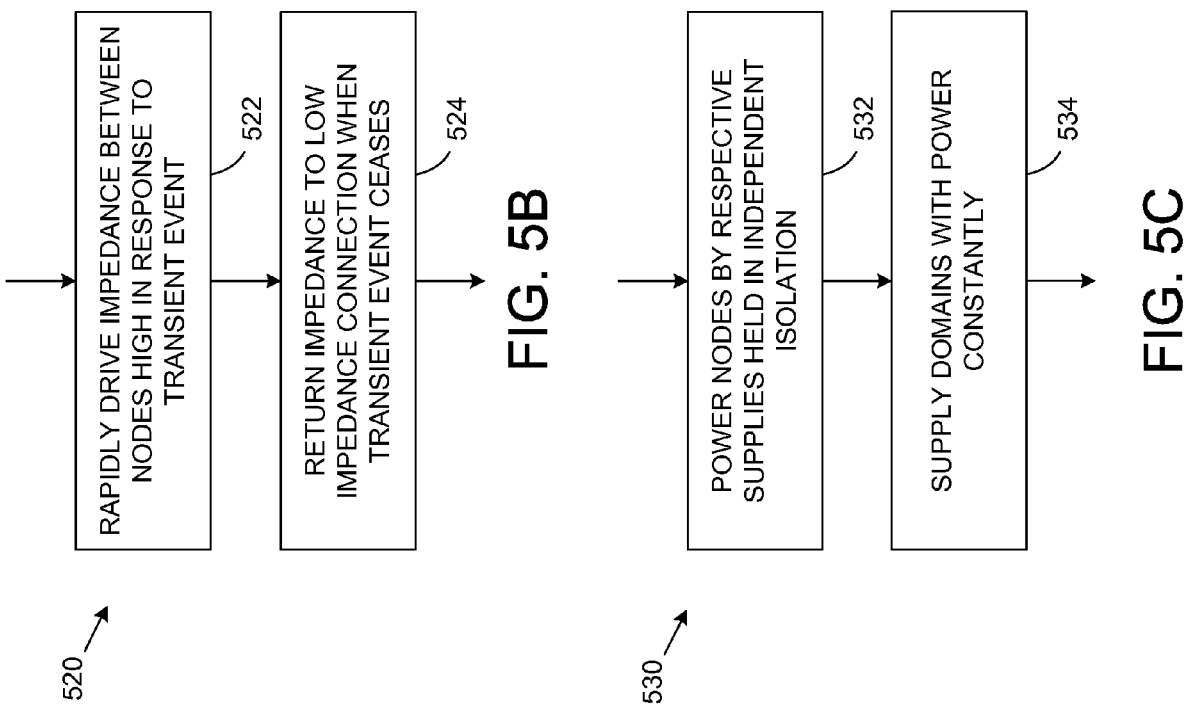

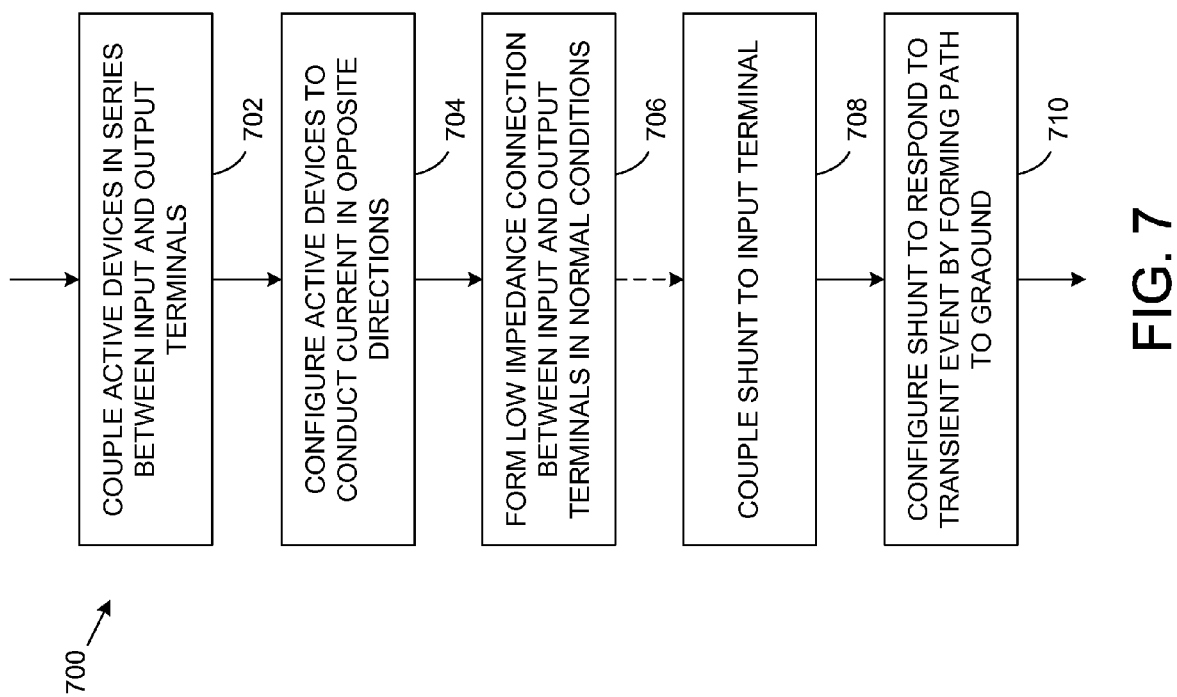

ACTIVE CLAMP PROTECTION DEVICE

BACKGROUND

Many electronic systems for usage in various applications such as network communications, telecommunications, data transmission, and many others are susceptible to damage resulting from transient energy. Lightning and other surge energy events can create rapid electrical energy transients. Such transient events can damage electronic circuits or equipment.

Some circuit arrangements include two or more circuits that are connected but operate with reference to ground potentials that may be different. In response to various conditions, electrical current may flow between different ground domains so that the ground potentials can bounce relative to one another, which may be a source of common-mode noise. In a communication application, the generated noise can interfere with communication between ground domains.

A conventional clamping circuit can be used to prevent another circuit from exceeding a predetermined voltage level and functions by sensing the output voltage of the monitored circuit and, if the output voltage approaches or exceeds the limit, applying a load. The applied load draws current in a regulated manner to prevent the output voltage from exceeding the limit. The clamp circuit generally operates with lower output impedance than the monitored circuit so that the circuit is overpowered.

SUMMARY

According to an embodiment of a network device, an active clamp device electrically couples first and second nodes in respective first and second supply domains referenced to ground potentials that can be different. The active clamp device comprises first and second active devices controlled by signals respectively referenced to the first and second supply domains that create a short-circuit or low impedance connection between the first and second nodes in normal operation and drive impedance between the first and second nodes high in response to a transient event.

BRIEF DESCRIPTION OF THE DRAWINGS

Embodiments of the invention relating to both structure and method of operation may best be understood by referring to the following description and accompanying drawings:

FIG. 4A is a block diagram which illustrates a functional view of a circuit enabling creation of an isolated supply for a protection apparatus, indicating the high impedance to the isolated portion of the circuit;

FIG. 4C is a pictorial diagram depicting a pin-out structure of a differential PHY protection apparatus;

FIGS. 5A, 5B, and 5C are schematic flow charts illustrating an embodiment of a transient protection method for protecting an electronic system against transient energy and suppressing noise;

FIG. 7 is a schematic flow chart depicting an embodiment of a method electronic devices and components against transient energy.

DETAILED DESCRIPTION

A clamping device enables two electrically-connected nodes to become a short circuit or low resistance in normal conditions but to form an open circuit under strong surge or transient events. In various embodiments, the clamping device can function as a cross-clamp combined with surge protection. In some illustrative embodiments, protection is implemented when independent supplies are available in a system. In other embodiments, protection is attained in a circuit that generates a pseudo-isolated or surge-isolated supply using a switched capacitor or other circuit. In further embodiments, protection is implemented in a circuit that generates a surge-isolated supply through usage of resistors alone.

In a particular application, an active clamping circuit can be used in an appropriate configuration to directly protect transceivers of physical layer (PHY) devices in a transmission signal path to prevent surge events from damaging the PHY device.

The various embodiments of active clamping devices can be used generally in any application that has low impedance for normal operation and high impedance during transient current/voltage events. Accordingly, the disclosed clamping devices have potential application outside of surge protection, for instance circuits and systems with common-mode immunity capability and non-linear signal separation.

Another application of various embodiments of the active clamping circuit disclosed herein is a series current limiting element that can protect a PHY transmitter or receiver device wherein the active clamping circuit is combined in series with a sensitive transmission signal path, often differential. The active clamping device ensures that over-voltage and over-current events do not discharge through the either the transmitter or receiver element but instead are harmlessly passed to earth ground via a shunting surge element.

Figure 3A:
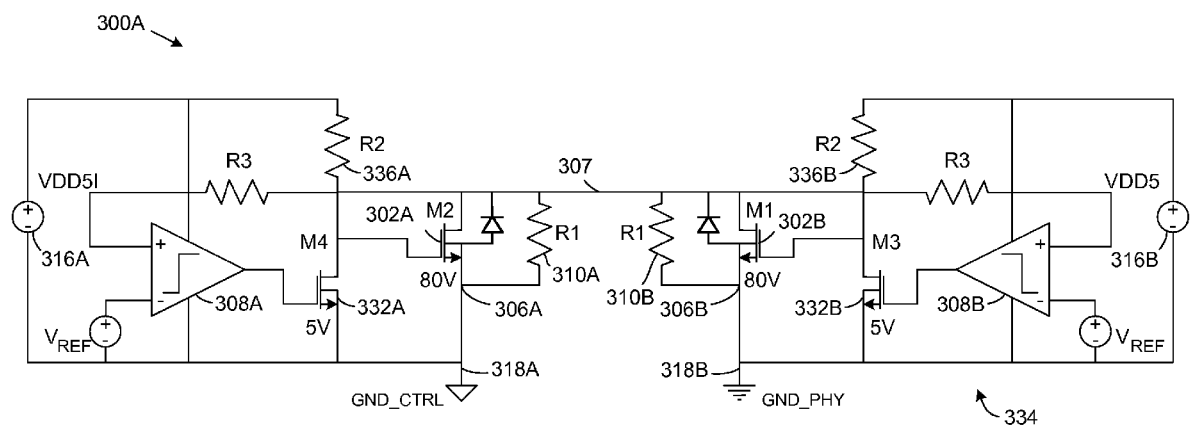
FIGS. 3A and 3B are schematic block diagrams depicting embodiments of an electronic apparatus that can be used to protect electronic equipment from potentially harmful transient events and reduce or eliminate noise resulting from current flow between different supply domains while allowing current flow to reduce common-mode emissions.

Referring to FIG. 3A, a schematic block diagram depicts an embodiment of an electronic apparatus 300A that can be used to protect electronic equipment from potentially harmful transient events and reduce or eliminate common-mode noise that is a result of switching transients in DC/DC converters that flow from the primary side to the secondary side of the power transformer. The electronic apparatus 300A can comprise first 302A and second 302B Metal Oxide Semiconductor Field Effect Transistor (MOSFET) enhancement mode devices that are coupled respectively in series between first 304A and second 304B supply domains and coupled to respective first 306A and second 306B nodes. First 308A and second 308B active circuits are coupled to gates of the respective first 302A and second 302A MOSFET enhancement mode devices and operate to close the respective device in low current/voltage conditions while opening the respective device for large currents.

The MOSFETs 302A and 302B operate as switches that are closed for low currents and/or voltages and open for large DC and/or transient currents under control of the active circuits 308A, 308B. The active circuits 308A, 308B are connected to control the switches 302A and 302B and reference to ground domains that can be different. In the illustrative embodiment, the grounds can be described as a control ground (GND_CTRL) which corresponds to an output node or pin and a physical layer (PHY) ground (GND_PHY) which corresponds to an input node or pin.

In a different implementation, instead of a direct ground potential a high-voltage capacitor can be used to connect either ground side potential to allow isolation while maintaining low impedance to reduce common-mode noise. Various circuits disclosed herein can be used to provide an isolated supply potential.

The illustrative electronic apparatus 300A includes active devices and accordingly is a powered circuit, as distinguished from circuits using depletion-mode devices that can be non-powered. The use of active devices enables integration into a much wider range of process technologies where depletion mode devices are not generally available. For clarification of definitions herein, note that native MOSFET transistors in some processes under certain conditions are called depletion mode devices but would still require active gate control to provide good performance. Such devices are defined as "enhancement mode" devices since threshold voltages are not sufficiently negative to be used without power. The illustrative embodiment of the electronic apparatus 300A can be configured for high voltage application. Voltages between the grounds 318A and 318B can move a relatively large voltage apart. In a particular embodiment, the grounds can move 60-70 volts apart, although other configurations can operate at different levels. The shunting circuit that sets the voltage movement of the grounds can be the TlessConnect™ circuit described hereinafter.

First 310A and second 310B circuits can be coupled across the respective first 302A and second 302A MOSFET enhancement mode devices in a configuration such that removal of a transient condition returns the short-circuit or low impedance connection between the first 306A and second 306B nodes, thereby returning to normal operation. Circuits 310A and 310B ensure that once a condition is removed, ground potential for the two references returns concurrently. The circuit can be designed, for example by selection of resistors 336A and 336B, for fast opening and slow closing of the switches 302A, 302B, for example using the resistors 336A and 336B rather than directly driving switches. In the illustrative embodiment, the circuits 310A and 310B are depicted as resistors 310A and 310B that return the circuit to low impedance operation. Use of resistors enables control of impedance in a relatively simple implementation. Other embodiments, the control circuits can be arranged to detect removal of the transient condition and returns the short-circuit or low impedance connection between the first and second nodes and normal operation. A protection circuit can be constructed to return to the short-circuit or low impedance condition by monitoring output and input nodes for detection of a condition that either the current or voltage transient has diminished. An active circuit can be controlled that returns the switches 302A, 302B to normal operation.

The electronic apparatus 300A can be configured to rapidly drive impedance between the first 306A and second 306B nodes high in response to the transient event while returning to a short-circuit or low impedance connection between the first 306A and second 306B nodes when the transient event has ceased. Thus, the illustrative electronic apparatus 300A is configured to handle large current transients. Inherent in a MOSFET transistor is a transient limiting capability that arises because once current in the transistor is sufficiently large, the drain-to-source voltage rises to the point that the transistor will saturate, enabling a first level of surge protection that is inherently extremely fast-acting. The transient limiting capability protects against electrostatic discharge (ESD) events such as those defined in International Electrotechnical Commission (IEC) standard 61000-4-2, which have very high current, for example as much as 30 A, and short durations. Active shutting off of devices is more pertinent for slow acting but longer duration events such as events defined in IEC 61000-4-5.

The first 316A and second 316B power supplies are independent and DC isolated from one another with power to operate the circuit continuous even during the surge event.

The active devices 308A, 308B are depicted as comparators. In normal operation, as long as the voltage at the centerpoint 307 is lower than a predetermined reference voltage which is set by the comparators 308A, 308B, then the clamping apparatus 300A remains in normal operation. Under conditions of a strong surge or stress event, then the voltage at point 307 is elevated and one of the two comparators 308A, 308B is activated and shuts off the relatively large MOSFET device 302A or 302B that is controlled by the activated comparator. The comparators 308A, 308B control the large MOSFETs 302A, 302B through low or medium size transistors 332A, 332B to facilitate switching and overcoming the parasitic diodes that can be inherent in the back-to-back MOSFETs 302A, 302B which are coupled in series.

In some embodiments, the electronic apparatus 300A can be configured as a generic protection device rather for a particular application. In a specific example embodiment, the high voltage MOSFETs 302A, 302B can be 80 volt devices and the low or middle voltage transistors 332A and 332B can be 5 volt devices.

Figure 4B:
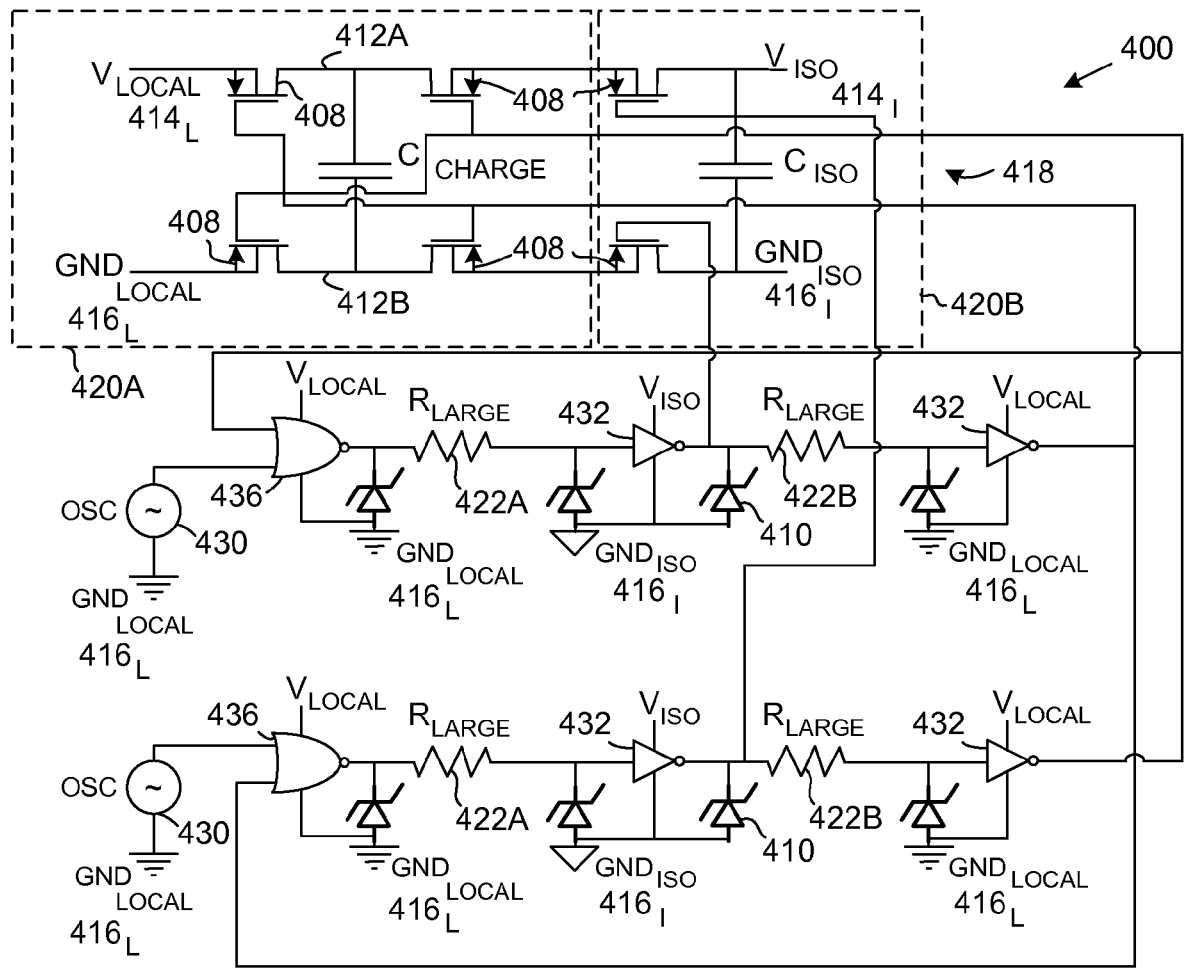
FIG. 4B is a schematic circuit diagram showing a switched-capacitor approach to generating a surge isolated supply which allowing a draw of high current from the isolated domain within the protection apparatus.

The illustrative electronic apparatus 300A depicts a singled-ended structure. In other embodiments, a differential configuration may be implemented. For example, the first and second nodes can be powered by respective first and second transient-isolated power supplies that are held mutually independent in transient isolation by a differential active clamp device that transfers power from the transient-isolated power supplies using a switched-capacitor circuit such as is shown in FIGS. 4A, 4B, and 4C.

In some embodiments, the electronic apparatus 300A can be formed using a silicon-on-insulator (SOI) process. In other embodiments, the electronic apparatus 300A can be formed using a junction-isolated process. Various other processes may also be suitable. The electronic devices 300A and 300B are typically a highly suitable application for the silicon-on-insulator (SOI) process. The silicon-on-insulator (SOI) process reduces the amount of electrical charge that a transistor moves during a switching operation, thereby increasing switching speed and reducing switching energy over other processes such as CMOS. SOI differs from generic CMOS in that a silicon junction is located above an electrical insulator so that the insulator reduces capacitance. Thus, a transistor can switch after a smaller amount of charging, thereby reducing switching time, elevating resistance to latch-up, and reducing leakage. The SOI process also allows higher voltages between the input and output nodes, due to parasitic devices breakdown voltages, than would be allowed on a standard junction isolated process. In some configurations, a deep nwell CMOS process can potentially provide isolation that would be sufficient for a lower voltage application, such as applications in embodiments shown hereinafter.

Figure 3B:
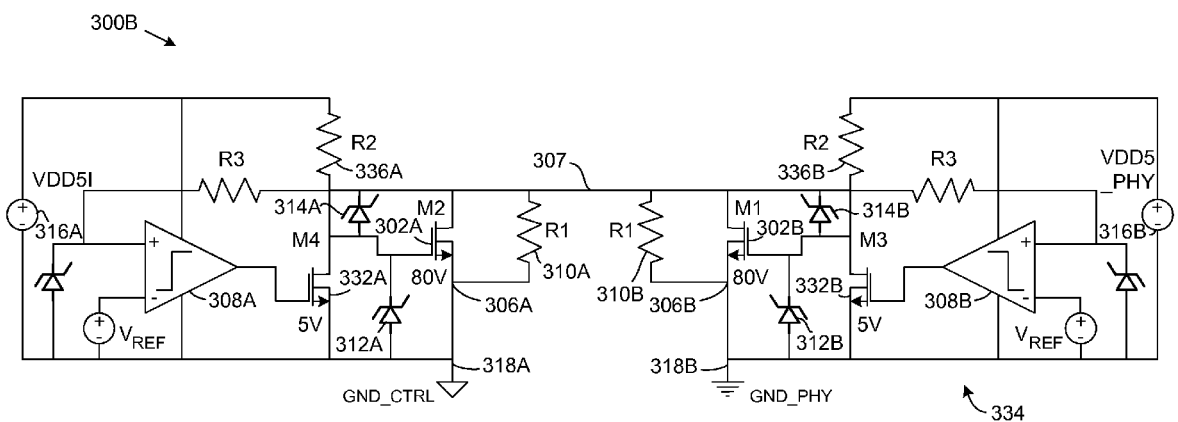

FIGS. 3A and 3B depict embodiments wherein multiple independent supplies 316A, 316B are available to the circuit, and illustrate example techniques for coupling the independent supplies 316A, 316B. Referring to FIG. 3B, a schematic block diagram shows another embodiment of an electronic apparatus 300B that can be used for transient protection, node suppression, and the like. The electronic apparatus 300B can comprise one or more shunt devices 312A coupled from the first node 306A to a point that has low impedance to an earth ground reference 318 for shunting transient event energy to the earth ground reference 318A. The shunt devices 312A, 312B, 314A, 314B can be coupled around the MOSFETs 302A, 302B in compliance with Joint Electron Device Engineering Council (JEDEC) specifications, for example JEDEC 2000V ESD chip level specifications, while still limiting system level surge events. Such JEDEC compliance ensures that the devices can handle transient events before assembly into a system.

Some embodiments may further comprise one or more shunt devices 312B coupled between the second active circuit 308A and the second MOSFET enhancement mode device 302B and can be controlled by the second active circuit 308B for shunting transient event energy to a ground reference 318B. FIG. 3B depicts the shunt devices 312A, 312B, 314A, and 314B as single zener diodes. Other embodiments may implement any suitable configuration, such as multiple diodes in series or parallel, which can be selected on the basis of various considerations such as process technology.

In various embodiments and arrangements, the shunt devices can be selected from among zener diodes, avalanche diodes, diode stacks, snapback metal oxide semiconductor field effect transistor (MOSFET)s, a Silicon-Controlled Rectifier (SCR) thyristors, other transient suppressor circuits, or the like.

Referring again to FIGS. 3A and 3B, further embodiments of an apparatus 300A,B for transient protection are illustrated. An active clamp device 300A,B electrically couples first and second nodes in respective first 304A and second 304B supply domains which are referenced to ground potentials 318A and 318B that can be different. The active clamp device 300A comprises first 302A and second 302B high voltage devices coupled in parallel to first 332A and second 332B low and/or medium voltage devices, respectively. The first 302A and second 302B high voltage devices are controlled by signals respectively referenced to the first 304A and second 304B supply domains.

The active clamp device 300A,B can further comprise a controller 334 coupled to the first 302A and second 302B high voltage devices and the first 332A and second 332B low and/or medium voltage devices. The controller 334 can be controlled by the signals that are respectively referenced to the first 304A and second 304B supply domains to create a short-circuit or low impedance connection between the first 306A and second 306B nodes in normal operation and increase impedance between the first 306A and second 306B nodes sufficiently to isolate against destructive transient energy in response to a transient event.

For example, the active clamp device 300A,B can include a controller 334 that comprises first 308A and second 308B comparators coupled respectively to the first 302A and second 302B high voltage devices and the first 332A and second 332B low and/or medium voltage devices. The first 308A and second 308B comparators are controlled by the signals respectively referenced to the first 304A and second 304B supply domains to create a short-circuit or low impedance connection between the first and second nodes in normal operation and increase impedance between the first and second nodes sufficiently to isolate against destructive transient energy in response to a transient event.

The active clamp device 300A,B can further comprise first 310A and second 310B resistors respectively coupled across the first 302A and second 302B high voltage devices so that removal of a transient condition returns the short-circuit or low impedance connection to node 307 in normal operation.

One or more shunt devices 312 can be coupled to at least one of the first 302A and second 302B high voltage devices for shunting transient event energy to an earth ground reference 318. In various embodiments and arrangements, the shunt devices 312 can be selected from among zener diodes, avalanche diodes, diode stacks, snapback metal oxide semiconductor field effect transistor (MOSFET)s, a Silicon-Controlled Rectifier (SCR) thyristors, other transient suppressor circuits, or the like.

The active clamp device 300A can be constructed using any suitable process, for example a silicon-on-insulator process, a junction isolated process, or another process.

The active clamp device 300A can operate to rapidly drive impedance between the first 306A and second 306B nodes high in response to the transient event and return to the short-circuit or low impedance connection between the first 306A and second 306B nodes when the transient event has ceased.

The first 306A and second 306B nodes can be respectively powered by first 316A and second 316B power supplies that are held in substantially independent isolation by the active clamp device 300A whereby circuits referenced to the respective first 304A and second 304B supply domains are supplied with power constantly including during the transient event.

In accordance with a specific embodiment of an electronic apparatus 300A shown in FIG. 3A, first 302A and second 302B Metal Oxide Semiconductor Field Effect Transistor (MOSFET) depletion mode devices can coupled respectively in series between first 304A and second 304B supply domains and coupled to first 306A and second nodes 306B. The electronic apparatus 300A can further comprise first 308A and second 308B active circuits coupled to gates of the respective first 302A and second 302B MOSFET depletion mode devices, thereby operating to close the appropriate device for a low current/voltage condition and open the device for large currents.

In accordance with another specific embodiment of an electronic apparatus 300A shown in FIG. 3A, first 302A and second 302B Junction Field Effect Transistor (JFET) devices coupled respectively in series between first 304A and second 304B supply domains and coupled to respective first 306A and second 306B nodes. First 308A and second 308B active circuits can be coupled to gates of the first 302A and second 302B JFET devices, thereby functioning to close the appropriate device for a low current/voltage condition and open the device for large currents.

Referring again to FIG. 3A, a further embodiment of an apparatus 300A for transient protection is shown. An active clamp device 300A electrically couples first 306A and second 306B nodes in respective first 304A and second 304B supply domains coupled through low impedance to separate ground potentials. The active clamp device 300A comprises first 302A and second 302B active devices controlled by signals respectively referenced to the first 304A and second 304B supply domains and create a short-circuit or low impedance connection between the first 306A and second 306B nodes in normal operation and increase impedance between the first 306A and second 306B nodes sufficiently to isolate against destructive transient energy in response to a transient event.

Referring to FIGS. 4A, 4B, and 4C, schematic block diagrams show an embodiment of a protection apparatus 400 that can be used for transient protection and noise reduction and illustrate an example implementation of a differential circuit. FIG. 4A is a block diagram which illustrates isolated supply generation for the protection apparatus 400 and indicates the high surge impedance of the circuit. FIG. 4B is a schematic circuit diagram showing a switched-capacitor approach to generating a surge-isolated supply which allows high current to be drawn from the isolated domain within the protection apparatus 400. FIG. 4C depicts a pin-out structure of the protection apparatus 400.

The illustrative protection apparatus 400 can comprise one or more protection circuits 402 that couple a plurality of input 404I and output 404O nodes and one or more ground references 416. The protection apparatus 400 comprises a plurality of active devices 408 and at least one shunt device 410. The active devices 408 are controlled by signals at the input nodes 404I and the output nodes 404O that function as switches and create a short circuit or low impedance connection between the input and output nodes in normal operation and increase impedance between the input and output nodes to isolate against destructive transient energy in response to a transient event. The one or more shunt devices 410 are shunting means that are configured to conduct transient currents associated with destructive transient energy to a ground reference 416.

The protection apparatus 400 is a differential circuit and enables formation of an independent supply from the local supply 414L. The differential circuit 400 includes a differential input terminal 404I, a differential output terminal 404O, local powering $V_{LOCAL}$ 414L, and ground $GND_{LOCAL}$ $416_L$ and $GND_{ISO}$ $416_I$.

FIG. 4A shows a local supply $V_{LOCAL}$ 414L that is input to the protection apparatus 400 and the isolated supply $V_{ISO}$ 414I which is created by the circuit 400. The $V_{LOCAL}$ 414L is not truly DC isolated from the local supply $V_{LOCAL}$ 414L but is effectively surge-protected, isolated, or surge-isolated due to the large resistance $R_{LARGE}$ or impedance between the supplies and the switched-capacitor circuit 418. Most pertinently, the protection apparatus 400 enables the portion of the circuit labeled isolated to operate independently during a surge or transient event.

The switched-capacitor circuit 418 facilitates transient protection and transfers charge from the local supply $V_{LOCAL}$ 414L to the isolated supply $V_{ISO}$ 414I using, for example, a non-overlapping clock driver 430. The protection apparatus 400 includes surge protection circuitry that functions during a surge or transient event by opening the circuit between the two supplies so that the transient or surge event does not activate the isolated portion of the system. When the transient energy is no longer present, the protection apparatus 400 restores the high impedance connection between the supplies to restart the isolated portion of the circuit using a much smaller amount of power than the power to drive the main switch 408. Very large resistances and high impedances drive the circuit that powers the isolated portion of the circuit. The differential protection circuit 400 can operate with low power expenditure and can be formed through usage of large resistors $R_{LARGE}$. The switched-capacitor circuit 418 is illustratively clocked through a series of inverters 432 and large resistances $R_{LARGE}$. During a transient event, the protection apparatus 400 powers the isolated portion so that the reference potential $GND_{ISO}$ follows the surge energy up and down so that the energy does not couple directly through low impedance to the local supply $V_{LOCAL}$ 414L.

In the illustrative embodiment, components of the protection apparatus 400 include zener diodes 410, inverters 432, NOR gates 436, and large resistors $R_{LARGE}$, and MOSFETs 408.

The zener diodes 410 coupled adjacent the NOR gates 436, and inverters 432 operate to supply shunt protection. Other embodiments may increase or reduce the number, or eliminate usage, of the zener diodes for applications and conditions of varying exposure to surge and transient energy.

Referring again to FIGS. 4A, 4B, and 4C, another embodiment of a transient event protection apparatus 400 is illustrated. The transient event protection apparatus 400 comprises two or more differential input terminals 404I and two or more differential output terminals 404O. A first protection circuit 412A is coupled between a first of the differential input terminals 404I and a first of the differential output terminals 404O. Similarly, a second protection circuit 412B is coupled between a second of the differential input terminals 404I and a second of the differential output terminals 404O. A local supply 414L is coupled to power a first portion 420A of the transient event protection apparatus 400 relative to a local ground reference 416L. A switched-capacitive circuit 418 is coupled to the first 412A and second 412B protection circuits and formed to create an independent supply 414I that powers a second portion 420B of the transient event protection apparatus 400 relative to an associated independent ground reference 416I.

The transient event protection apparatus 400 can further comprise a first resistance 422A coupled between the local supply 414L and the independent supply 414I and a second resistance 422B coupled between the local ground reference 416L and the independent ground reference 416I. The switched capacitive circuit 418 transfers charge from the local supply 414L between the first 412A and second 412B protection circuits so that the independent supply 414I is isolated from the local supply 414L.

The switched capacitive circuit 418 isolates the independent supply 414I from the local supply 414L whereby energy in the second portion 420B of the transient event protection apparatus 400 can move independently in response to a transient event and is isolated from coupling to the first portion 420A and the local supply 414L.

In the illustrative embodiment, the first 412A and second 412B protection circuits can individually comprise first 408A and second 408B active devices coupled in series in a configuration that conducts current in opposite directions so that the active devices 408A and 408B operate mutually out-of-phase. The active devices 408A and 408B are controlled, for example via some type of external protection or external active circuitry to control gates of the active devices 408A and 408B, to create a short-circuit or low impedance connection between the first 420A and second 420B portions of the transient event protection apparatus 400 in normal operation and increase impedance between the first 420A and second 420B portions sufficiently to isolate against destructive transient energy in response to a transient event.

A shunt 410 can be coupled to at least one of the protection circuits 412A and/or 412B and configured to respond during a transient event by forming a pathway for shunting transient energy to local ground 416L. In various specific implementations, the shunt 410 can be a parallel surge detection circuitry that is optional and can be included or excluded from the circuit.

In accordance with another embodiment of a protection apparatus 400 as shown in FIGS. 4A, 4B, and 4C, the protection apparatus 400 can comprise at least one protection circuit 402 that couple a plurality of input 404I and output 404O nodes. The protection apparatus 400 comprises a plurality of active devices 408. The active devices 408 are controlled by signals at the input nodes 404I and the output nodes 404O that create a short circuit or low impedance connection between the input and output nodes in normal operation and increase impedance between the input and output nodes to isolate to isolate either a first node or a second node from either transient or short-circuit events. The impedance increase is sufficient to create a short circuit between the first and second node, preventing damage of a driving device on the isolated node. The protection apparatus 400 can be implemented to enable short-circuit protection whereby a shunt device can be eliminated.

The active devices 408 can be configured so that the impedance increase prevents an interaction of a transient event at the first node with circuits on the second node, a configuration that enables common-mode immunity testing or for conditions that a user desires to prevent a transient event.

In accordance with still another embodiment of a protection apparatus 400 as shown in FIGS. 4A, 4B, and 4C, the protection apparatus 400 can comprise at least one protection circuit 402 coupling a plurality of input 404I and output 404O nodes. The protection apparatus 400 comprises a plurality of active devices 408. The active devices 408 are controlled by signals at the input nodes 404I and the output nodes 404O that create a short circuit or low impedance connection between the input and output nodes in normal operation and increase impedance between the input and output nodes to isolate to isolate either a first node or a second node from either transient or short-circuit events. The impedance increase is sufficient to create high impedance to high currents whereby effects outside a range of normal current level are prevented. The active devices 408 can be constructed so that the impedance increase prevents an interaction of a transient event at the first node with circuits on the second node.

Figure 5A:
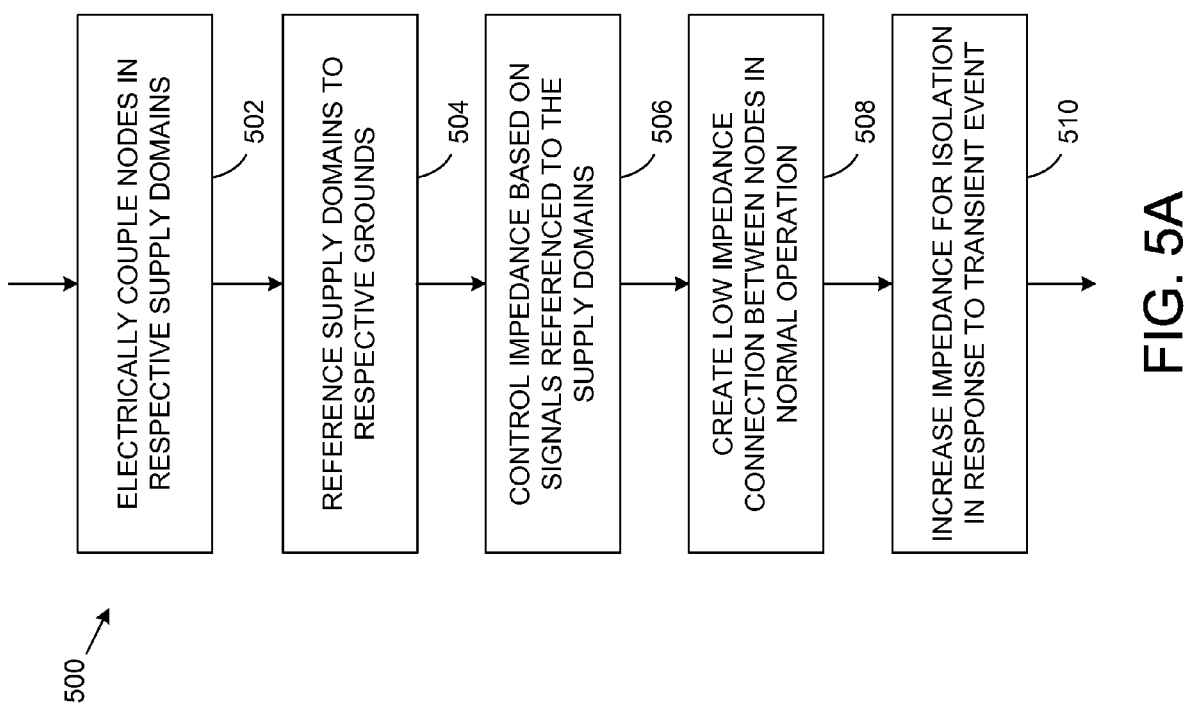

Referring to FIGS. 5A, 5B, and 5C, schematic flow charts illustrate an embodiment of a transient protection method 500 for protecting an electronic system against transient energy and suppressing noise. As shown in FIG. 5A, the method 500 comprises electrically coupling 502 first and second nodes in respective first and second supply domains and referencing 504 the first and second supply domains to ground potentials that can be different. Impedance is controlled 506 based on signals referenced to the first and second supply domains. A short-circuit or low impedance connection is created 508 between the first and second nodes in normal operation. Impedance is increased 510 between the first and second nodes sufficiently to isolate against destructive transient energy in response to a transient event.

Referring to FIG. 5B, in some embodiments a method 520 can include rapidly driving 522 impedance between the first and second nodes high in response to the transient event. In contrast, impedance can be returned 524 to the short-circuit or low impedance connection between the first and second nodes when the transient event has ceased.

Referring to FIG. 5C, the first and second nodes can be powered 532 by respective first and second power supplies that are held in substantially independent isolation. The method 530 can further comprise supplying 534 the respective first and second supply domains with power constantly, even during the transient event.

Figure 6A:
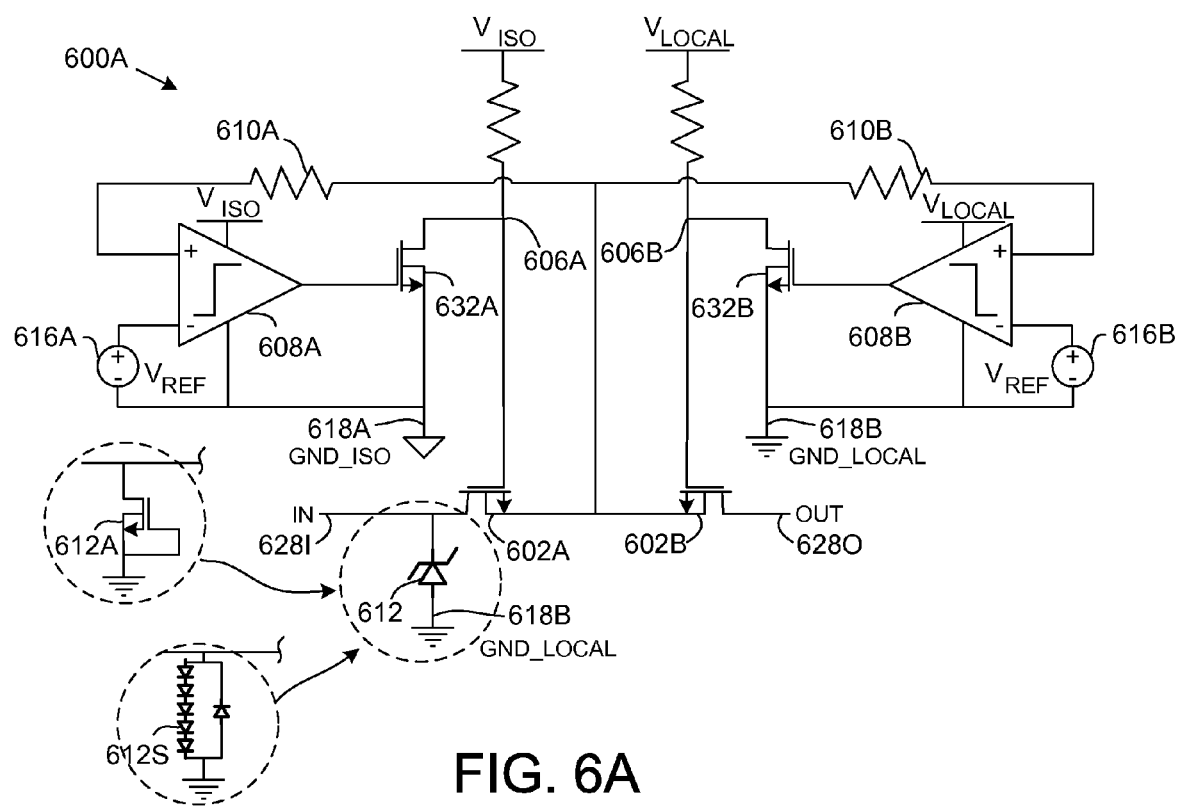
FIGS. 6A, 6B, 6C, 6D, and 6E are schematic block diagrams illustrating embodiments of a transient event protection apparatus.
Figure 6B:
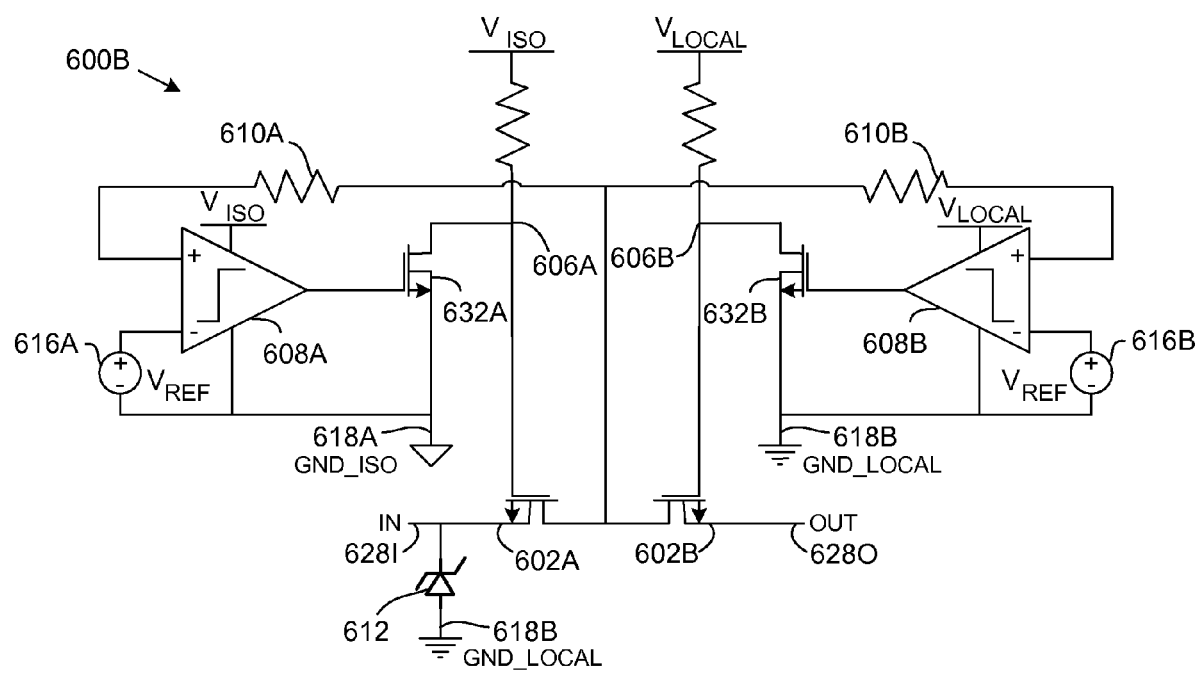

Referring to FIGS. 6A, 6B, 6C, and 6D, schematic block diagrams illustrate embodiments of a transient event protection apparatus 600A, 600B, 600C and 600D including example implementations of techniques for generating an isolated physical layer (PHY). A transient event protection apparatus 600A comprises a plurality of active devices 602A, 602B coupled in series between an input terminal 628I and an output terminal 628O. In various embodiments the illustrative active devices 602A, 602B can be N-channel metal oxide semiconductor (NMOS) transistors as shown in FIG. 6A, P-channel metal oxide semiconductor (PMOS) transistors as shown in FIG. 6B, or any other suitable active device. The active devices 602A and 602B are configured to conduct current in opposite directions. First 608A and second 608B control elements are respectively coupled to control the active devices 602A, 602B that conduct current in opposite directions. The first 608A and second 608B control elements are configured to create a short-circuit or low impedance connection between the input terminal 628I and the output terminal 628O in normal operation and increase impedance between the input terminal 628I and the output terminal 628O a sufficient amount to isolate against destructive transient energy in response to a transient event.

In the illustrative embodiment, a shunt 612 is coupled to the input terminal 628I and is arranged to respond during a transient event by forming a pathway that shunts transient energy to a low impedance path to an earth ground 618B. In some embodiments, the transient event protection apparatus 600A-D can have multiple shunts coupled in series to the input terminal 628I that can respond during the transient event by forming a pathway to shunt transient energy to earth ground. FIG. 6A depicts multiple examples of shunt devices that can be used in various implementations. One embodiment depicts a zener diode 612 coupled to local ground. In some embodiments, a zener diode can have a forward-biased diode. Another example that can be used in place of zener diode protection is an active device 612A such as an N-channel MOS (NMOS) device with a gate tied to ground. In another example of an active shunt device, a parasitic bipolar device can enable a snap back operation to enable protection. A further example is a stack of diodes coupled in series 612S coupled in parallel with another diode.

In the illustrative arrangement, the active devices 602A, 602B can be transistors coupled between the input terminal 628I and the output terminal 628O to conduct current in opposite directions. The first 608A and second 608B control elements are shown coupled to control terminals of the respective first 602A and second 602B transistors and are controlled by signals respectively referenced to first 616A and second 616B supply domains.

In a particular embodiment, the active devices 602A, 602B can be Metal Oxide Semiconductor Field-Effect Transistors (MOSFETs) coupled between the input terminal 628I and the output terminal 628O to conduct current in opposite directions. First 608A and second 608B comparators can be coupled to the control terminals of the first 602A and second 602B MOSFETs, respectively, and configured to compare signals between the input terminal 628I and the output terminal 628O with a voltage that is referenced to first 618A and second 618B references.

In a particular application, the input terminal 628I can be coupled to an Ethernet Physical Layer (PHY) and the transient event protection apparatus 600A-D configured to protect the Ethernet PHY by isolating against passing the destructive transient energy to the Ethernet PHY in response to the transient event. In other embodiments, the input terminal 628I can be configured for coupling to an interface or device and the transient event protection apparatus protects the interface and devices and systems coupled to the interface by isolating against passing the destructive transient energy to the interface. Any suitable type of device or interface can be protected, for example including Universal Serial Bus (USB) interfaces and/or devices, a RETMA standard (RS)-232 interfaces and/or devices, Transmission level 1 (T1) interfaces and/or devices, and others. Accordingly, the protection apparatus 600A-D can be used for a variety of physical layer (PHY) devices in a variety of applications.

The illustrative transient event protection apparatus 600A-D can be used as a PHY protection circuit which does not have independent supplies. The MOSFETs 602A, 602B can be connected with either the sources or drains coupled in bulk to the output node. In the illustrative embodiment, the drain is tied to the output node and the source tied to the middle node. The comparators 608A, 608B control the circuit 600A-D. At the input node 628I, another limiting circuit—the shunt 612—can be inserted so that, during a surge event, the voltage increases and the circuit 600A-D shuts down. The shunt 612 forms a path for the surge energy to pass to ground, preventing damaging energy from passing to the PHY. In a Power-over-Ethernet (PoE) application, the input node 628I can be connected to a transformer or may connect directly to a network line. In either case, damaging energy flows away from the PHY and into the transient event protection apparatus 600A-D. The transient event protection apparatus 600A-D activates and creates an open circuit, forming a path to ground and shunting the transient or shunt energy away from the PHY. Accordingly, the transient event protection apparatus 600A-D combines series protection with surge protection in the form of shunt parallel protection. In some embodiments and/or applications, the shunt 612 can be omitted.

Referring again to FIGS. 6A-6D, embodiments of a transient event protection apparatus 600A-D can comprise first 602A and second 602B active semiconductor devices coupled in series between an input terminal 628I and an output terminal 628O in a configuration so that the semiconductor devices 602A and 602B conduct current in opposite directions. The semiconductor devices 602A and 602B are controlled to create a short-circuit or low impedance connection between the input terminal 628I and the output terminal 628O in normal operation while increasing impedance between the input terminal 628I and the output terminal 628O sufficiently to isolate against destructive transient energy in response to a transient event. A shunt 612 can be coupled to the input terminal 628I to enable a response during a transient event which includes formation of a pathway shunting transient energy to an earth ground 618B of the system.

In the illustrative embodiments, the active control circuits are shown as comparators. In other embodiments, the control circuits can be implemented in other ways. For example, as shown in FIG. 6E, some embodiments may implement an active control circuit 608 using a sense resistor ($R_{SENSE}$) coupled between MOSFETs and coupled to an active circuit block, for example that can control a device such as an amplifier rather than a comparator. The control circuit may implement voltage sensing or current sensing to activate control operations. For example, a current sense control circuit can sense current and when the current becomes too high, activate the switches.

Figure 6C:
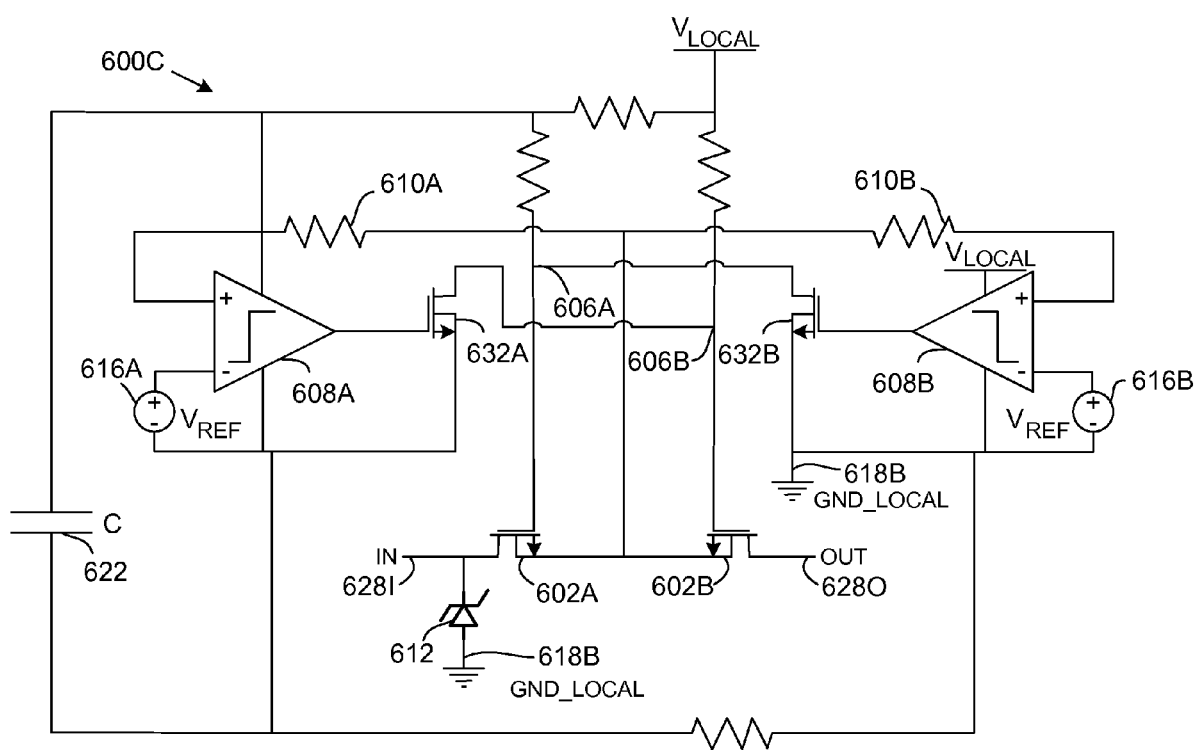
Figure 6D:
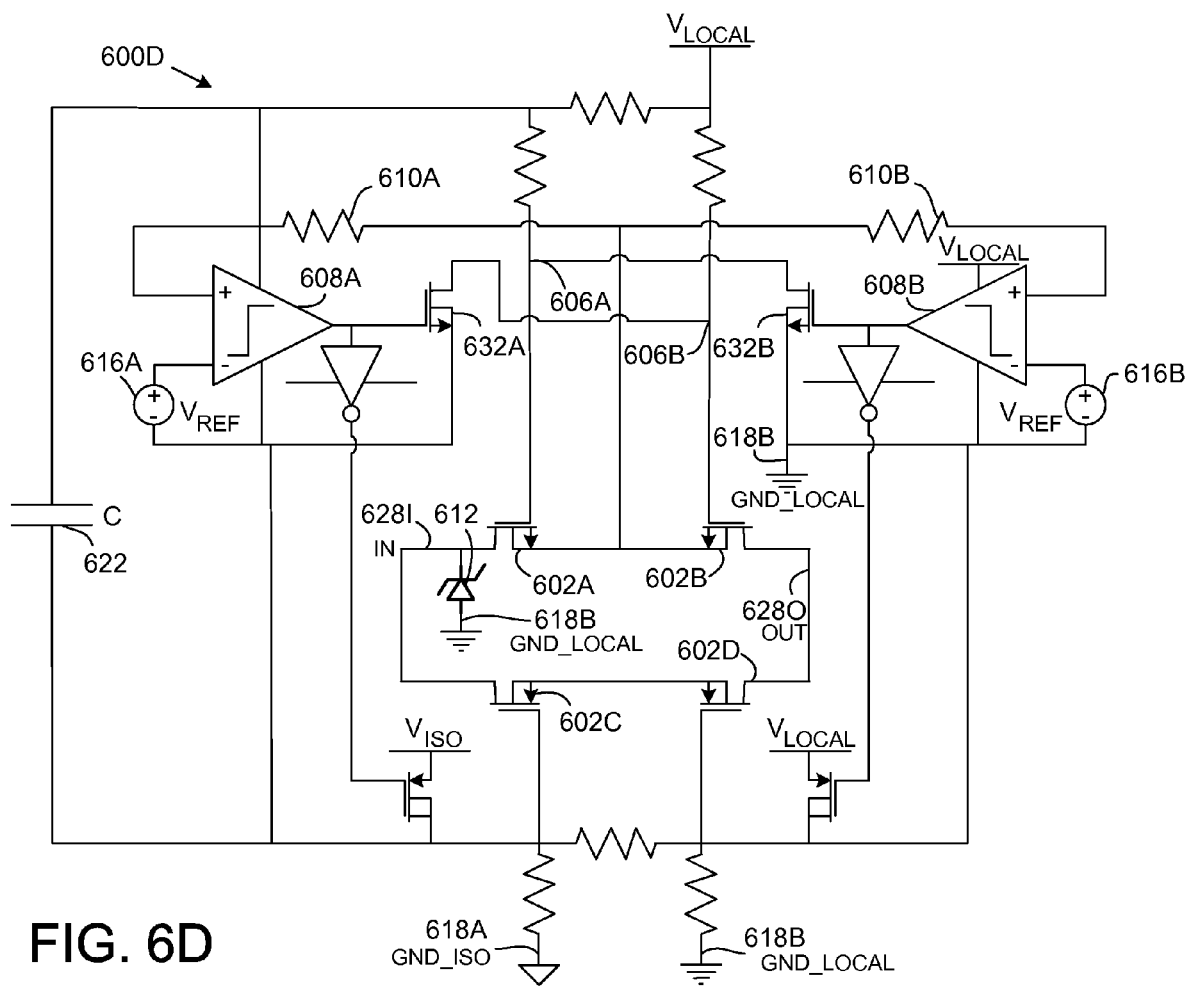
Figure 6E:
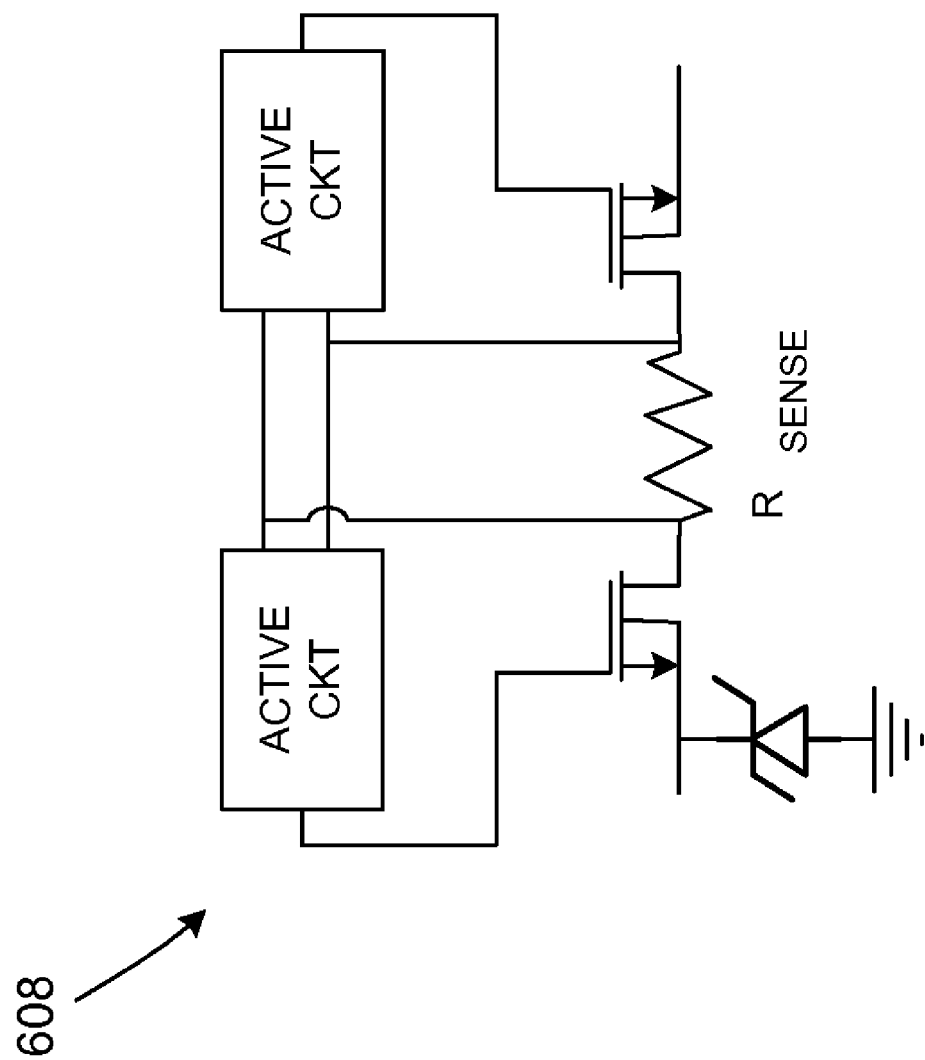

FIGS. 6C and 6D show embodiments of transient event protection devices 600C and 600D for usage in conditions that an isolated supply is not available. Cross-coupling of the control elements 608A and 608B enables creation of an isolated supply in the absence of an actual or physical isolated supply. Cross-coupling connects the input terminal through resistors that are sufficiently large to create a deterrent to the surge. The capacitor 622 stores the energy that is used to operate the protection circuit during a surge event. The time constant is set by values of the resistor and capacitor. The illustrative transient event protection devices 600C and 600D enable implementation of protection without usage of a switched-capacitor circuit and are highly suitable for implementation in a standard complementary metal-oxide-semiconductor (CMOS) process. In normal operation the current draw of these active devices 602A, 602B, for example MOSFETs, does not draw much capacitance and the control elements 608A, 608B, for example comparators, have very low power. The amount of current drawn through the circuit that ties to the isolated section of the circuit draws a low enough current that impact on the drive voltages for the active devices 602A, 602B is small or negligible. In contrast, during a surge event and the input surge is high, one active device tracks the surge event and ensures that the opposing active device remains shut off through operation of the cross-coupling. The transient event protection devices 600C and 600D, rather than generating an isolated physical layer (PHY), uses resistive isolation to generate a surge-isolated supply through usage of resistors alone since a relatively small amount of power is driven. Capacitive overcharge on the circuit moves up and down with the surge event.

FIGS. 6A, 6B, and 6C illustrate embodiments of transient event protection devices that include two MOSFET devices, either N-channel or P-channel, coupled in series in a structure that is most useful when the potential is near ground. However, in many applications a signal may be applied to the circuit that raises the potential substantially above ground, for example creating a large Vgs voltage on the MOSFET devices. FIG. 6D illustrates an embodiment comprising a plurality of MOSFET enhancement mode devices, specifically a circuit that includes both N-channel MOS (NMOS) 612A, 612B and P-channel MOS (PMOS) 614A, 614B transistors. The series-connected NMOS devices 612A, 612B are connected in parallel with series-connected PMOS devices 614A, 614B of the opposite polarity type to enable usage with a broader range of operating voltages. The transient event protection devices 600A-D are typically highly suitable for implementation using a junction-isolated process.

Referring to FIG. 7, a schematic flow chart depicts an embodiment of a method 700 electronic devices and components against transient energy. The illustrative transient event protection method 700 can comprise coupling 702 first and second active semiconductor devices in series between an input terminal and an output terminal and configuring 704 the first and second active semiconductor devices to conduct current in opposite directions. The first and second active semiconductor devices are controlled 706 to create a short-circuit or low impedance connection between the input terminal and the output terminal in normal operation and increase impedance between the input terminal and the output terminal sufficiently to isolate against destructive transient energy in response to a transient event.

In some applications, a shunt can be coupled 708 to the input terminal. The shunt can be configured 710 to respond during a transient event by forming a pathway for shunting transient energy to a local ground.

Figure 8:
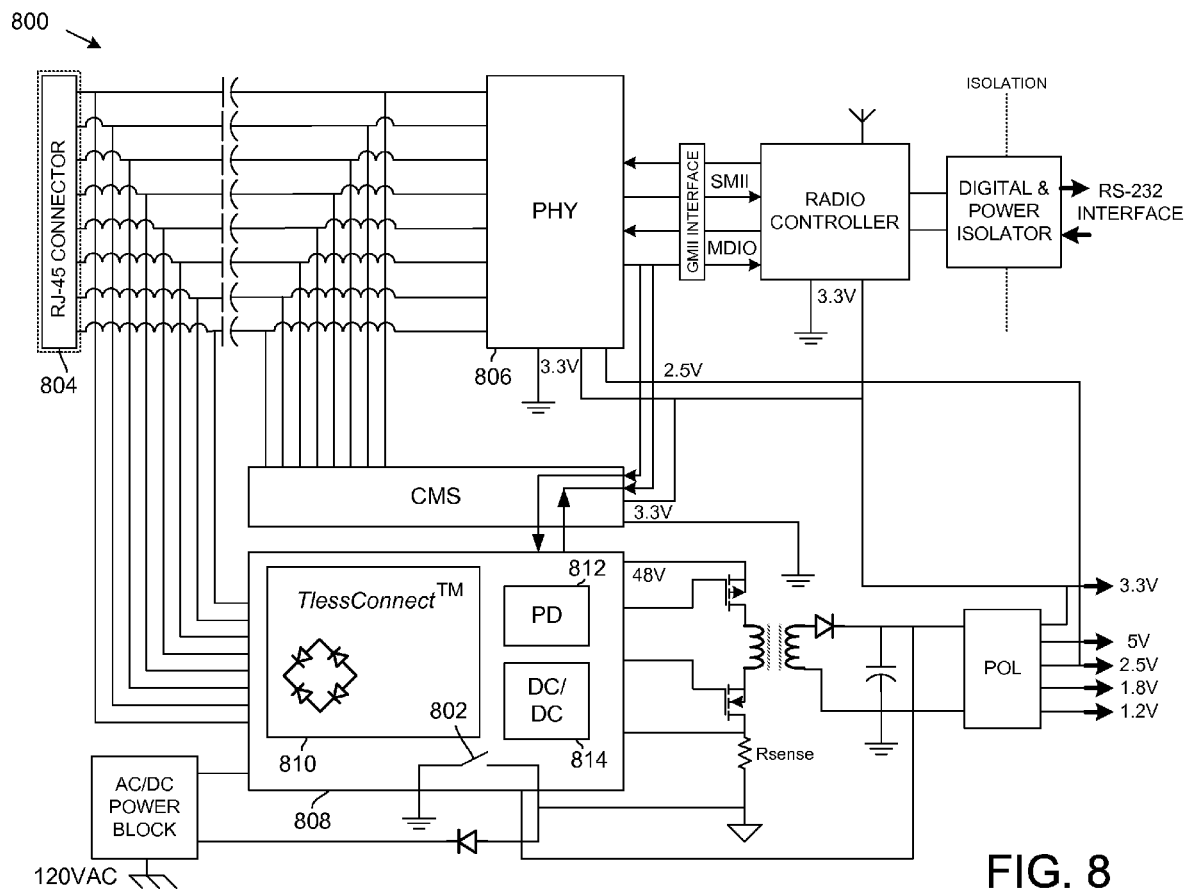
FIG. 8 is a schematic block diagram illustrating an embodiment of a Power-over-Ethernet (PoE) system that can include a transient protection apparatus according to the various disclosed embodiments.

Referring to FIG. 8, a schematic block diagram illustrates an embodiment of a Power-over-Ethernet (PoE) system 800 that can include a transient protection apparatus 802 according to the various disclosed embodiments. The PoE system 800 includes a network connector 804 coupled to an Ethernet Physical Layer (PHY) 806. A controller device 808 is coupled to the network connector 804 and to the PHY 806 and includes a Tconnect element 810 such as a TLessConnect™ solid state transformerless device, a powered device (PD) controller 812, and a DC-DC converter 814. The transient protection apparatus 802 is low impedance in formal operation. In response to a transient or surge event, the transient protection apparatus 802 creates an open circuit up to the voltage sufficient to fully turn on the Tconnect element 810, subsequently becoming a short-circuit again to enable passing strikes from the Tconnect element 810 to form a discharge path, directing the strikes away from an undesired path.

A pathway through the Tconnect element 810 forms a DC path for current that limits energy through the PHY 806. The Tconnect element 810 and the PHY 806 are referenced to different ground potentials. For even a relatively high level of cross-ground capacitance, for example 500 pF, the Tconnect 810 turns on rapidly, for in example in about 2 nanoseconds or less. The transient protection apparatus 802 can increase current in the Tconnect path.

In absence of the clamping capability of the transient protection apparatus 802, current flows through the PHY 806. Current initially flows into the PHY 806 and then switches to the Tconnect element 810, thereby moving the ground potentials apart. In a typical configuration, the amount of current for a positive strike is larger than for a negative strike. The clamping circuit in the transient protection apparatus 802 internally limits current, thereby limiting current through the PHY 806 and the Tconnect element 810. The clamping circuit functions to saturate and limit current. Current through the PHY 806 predominantly results from capacitance between the grounds.

The illustrative protection devices can be implemented in application-specific devices or as a standalone device. Possible applications include surge protection for any type of physical layer (PHY) such as an Ethernet PHY, a USB PHY, and any other suitable device that benefits from transient surge protection. The protection devices apply to general surge protection and protecting sensitive circuitry against surges from the outside world. Basic surge protection is attained in general through usage of devices coupled in series coupled to a shunt, typically in front of the series element. A specific example application is a Power-over-Ethernet application, although any suitable application may be implemented. The IEEE 802.3 Ethernet Standard, which is incorporated herein by reference, addresses loop powering of remote Ethernet devices (802.3af). Power over Ethernet (PoE) standard and other similar standards support standardization of power delivery over Ethernet network cables to power remote client devices through the network connection. The side of link that supplies power is called Powered Supply Equipment (PSE). The side of link that receives power is the Powered device (PD). Other implementations may supply power to network attached devices over alternative networks such as, for example, Home Phoneline Networking alliance (HomePNA) local area networks and other similar networks. HomePNA uses existing telephone wires to share a single network connection within a home or building. In other examples, devices may support communication of network data signals over power lines.

In various configurations described herein, a magnetic transformer of conventional systems may be eliminated while transformer functionality is maintained. Techniques enabling replacement of the transformer may be implemented in the form of integrated circuits (ICs) or discrete components.

Figure 1A:
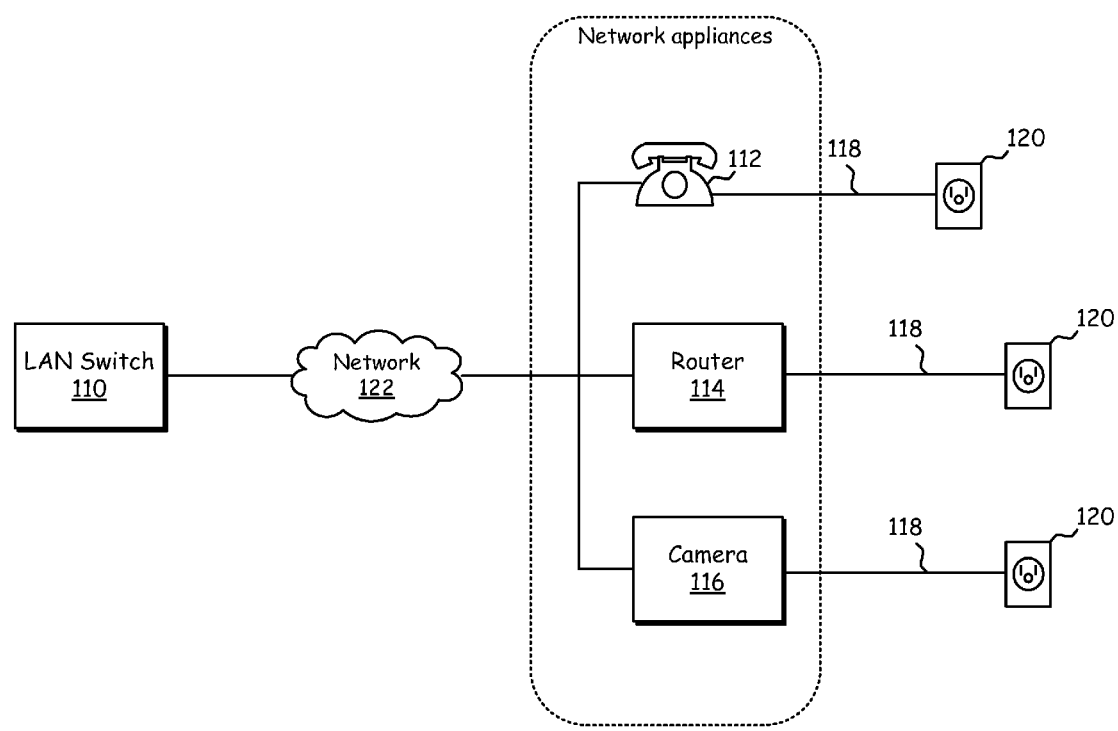
FIGS. 1A and 1B are schematic block diagrams that respectively illustrate a high level example embodiments of client devices in which power is supplied separately to network attached client devices, and a switch that is a power supply equipment (PSE)-capable power-over Ethernet (PoE) enabled LAN switch that supplies both data and power signals to the client devices.
Figure 1B:
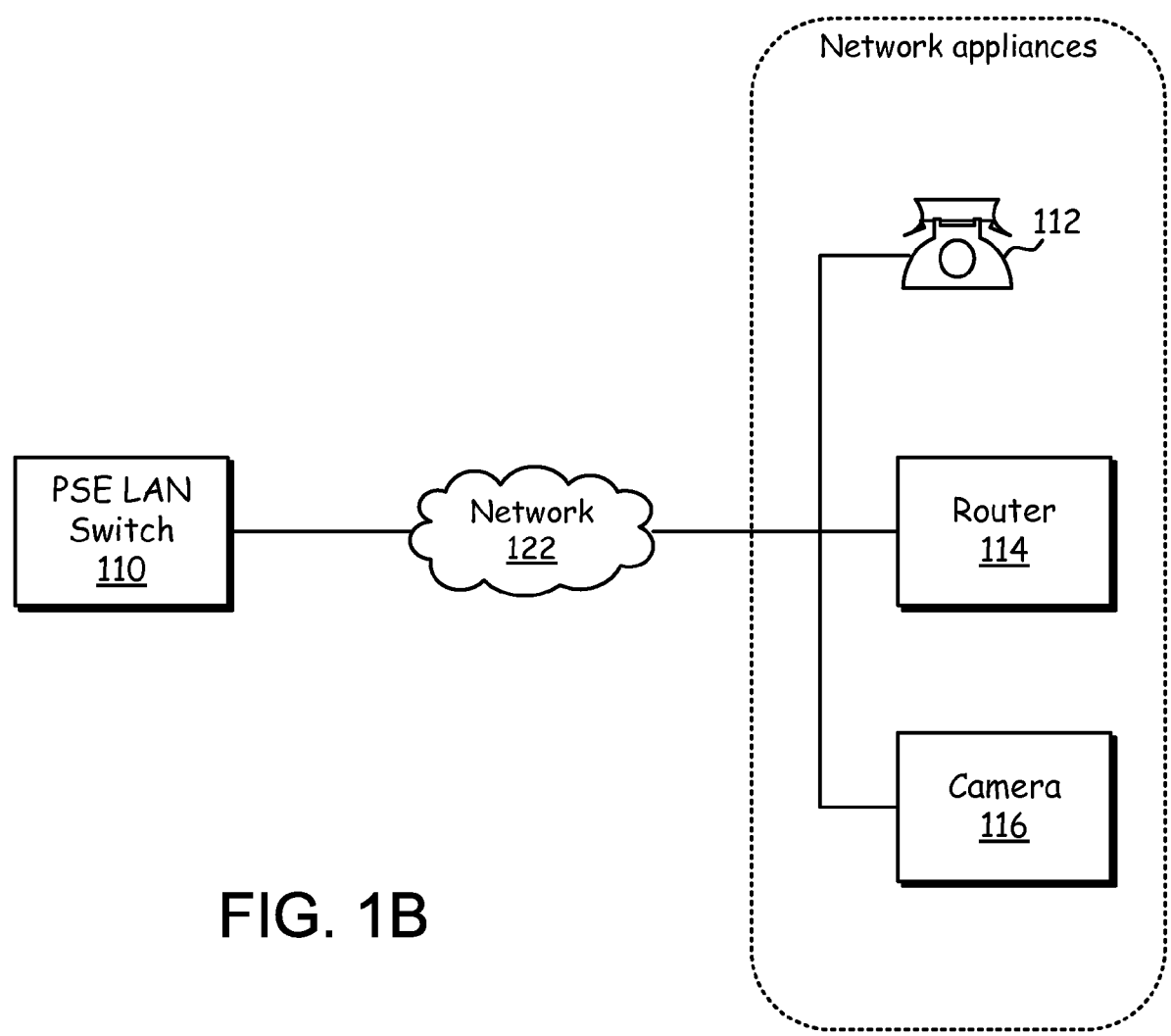

FIG. 1A is a schematic block diagram that illustrates a high level example embodiment of devices in which power is supplied separately to network attached client devices 112 through 116 that may benefit from receiving power and data via the network connection. The devices are serviced by a local area network (LAN) switch 110 for data. Individual client devices 112 through 116 have separate power connections 118 to electrical outlets 120. FIG. 1B is a schematic block diagram that depicts a high level example embodiment of devices wherein a switch 110 is a power supply equipment (PSE)-capable power-over Ethernet (PoE) enabled LAN switch that supplies both data and power signals to client devices 112 through 116. Network attached devices may include a Voice Over Internet Protocol (VOIP) telephone 112, access points, routers, gateways 114 and/or security cameras 116, as well as other known network appliances. Network supplied power enables client devices 112 through 116 to eliminate power connections 118 to electrical outlets 120 as shown in FIG. 1A. Eliminating the second connection enables the network attached device to have greater reliability when attached to the network with reduced cost and facilitated deployment.

Although the description herein may focus and describe a system and method for coupling high bandwidth data signals and power distribution between the integrated circuit and cable that uses transformer-less ICs with particular detail to the IEEE 802.3af Ethernet standard, the concepts may be applied in non-Ethernet applications and non-IEEE 802.3af applications. Also, the concepts may be applied in subsequent standards that supersede or complement the IEEE 802.3af standard.

Figure 2:
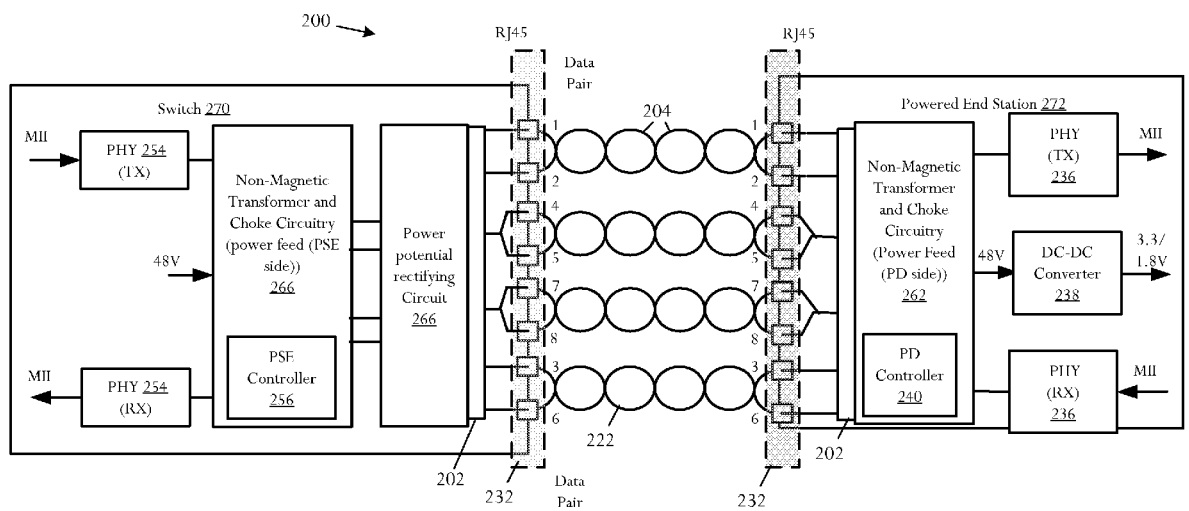
FIG. 2 is a functional block diagram illustrating a network interface including a network powered device (PD) interface and a network power supply equipment (PSE) interface, each implementing a non-magnetic transformer and choke circuitry.

Referring to FIG. 2, a functional block diagram depicts an embodiment of a network device 200 including a T-Less Connect™ solid-state transformer. The illustrative network device comprises a power potential rectifier 202 adapted to conductively couple a network connector 232 to an integrated circuit 270, 272 that rectifies and passes a power signal and data signal received from the network connector 232. The power potential rectifier 202 regulates a received power and/or data signal to ensure proper signal polarity is applied to the integrated circuit 270, 272. The network device 200 is shown with the power sourcing switch 270 sourcing power through lines 1 and 2 of the network connector 232 in combination with lines 3 and 6.

In some embodiments, the power potential rectifier 202 is configured to couple directly to lines of the network connector 232 and regulate the power signal whereby the power potential rectifier 202 passes the data signal with substantially no degradation. In some configuration embodiments, the network connector 232 receives multiple twisted pair conductors 204, for example twisted 22-26 gauge wire. Any one of a subset of the twisted pair conductors 204 can forward bias to deliver current and the power potential rectifier 202 can forward bias a return current path via a remaining conductor of the subset.

FIG. 2 illustrates the network interface 200 including a network powered device (PD) interface and a network power supply equipment (PSE) interface, each implementing a non-magnetic transformer and choke circuitry. A powered end station 272 is a network interface that includes a network connector 232, non-magnetic transformer and choke power feed circuitry 262, a network physical layer 236, and a power converter 238. Functionality of a magnetic transformer is replaced by circuitry 262. In the context of an Ethernet network interface, network connector 232 may be a RJ45 connector that is operable to receive multiple twisted wire pairs. Protection and conditioning circuitry may be located between network connector 232 and non-magnetic transformer and choke power feed circuitry 262 to attain surge protection in the form of voltage spike protection, lighting protection, external shock protection or other similar active functions. Conditioning circuitry may be a diode bridge or other rectifying component or device. A bridge or rectifier may couple to individual conductive lines 1-8 contained within the RJ45 connector. The circuits may be discrete components or an integrated circuit within non-magnetic transformer and choke power feed circuitry 262.

In an Ethernet application, the IEEE 802.3af standard (PoE standard) enables delivery of power over Ethernet cables to remotely power devices. The portion of the connection that receives the power may be referred to as the powered device (PD). The side of the link that supplies power is called the power sourcing equipment (PSE).

In the powered end station 272, conductors 1 through 8 of the network connector 232 couple to non-magnetic transformer and choke power feed circuitry 262. Non-magnetic transformer and choke power feed circuitry 262 may use the power feed circuit and separate the data signal portion from the power signal portion. The data signal portion may then be passed to the network physical layer (PHY) 236 while the power signal passes to power converter 238.

If the powered end station 272 is used to couple the network attached device or PD to an Ethernet network, network physical layer 236 may be operable to implement the 10 Mbps, 100 Mbps, and/or 1 Gbps physical layer functions as well as other Ethernet data protocols that may arise. The Ethernet PHY 236 may additionally couple to an Ethernet media access controller (MAC). The Ethernet PHY 236 and Ethernet MAC when coupled are operable to implement the hardware layers of an Ethernet protocol stack. The architecture may also be applied to other networks. If a power signal is not received but a traditional, non-power Ethernet signal is received the non-magnetic power feed circuitry 262 still passes the data signal to the network PHY.

The power signal separated from the network signal within non-magnetic transformer and choke power feed circuit 262 by the power feed circuit is supplied to power converter 238. Typically the power signal received does not exceed 57 volts SELV (Safety Extra Low Voltage). Typical voltage in an Ethernet application is 48-volt power. Power converter 238 may then further transform the power as a DC to DC converter to provide 1.8 to 3.3 volts, or other voltages specified by many Ethernet network attached devices.

Power-sourcing switch 270 includes a network connector 232, Ethernet or network physical layer 254, PSE controller 256, non-magnetic transformer and choke power supply circuitry 266, and possibly a multiple-port switch. Transformer functionality is supplied by non-magnetic transformer and choke power supply circuitry 266. Power-sourcing switch 270 may be used to supply power to network attached devices. Powered end station 272 and power sourcing switch 270 may be applied to an Ethernet application or other network-based applications such as, but not limited to, a vehicle-based network such as those found in an automobile, aircraft, mass transit system, or other like vehicle. Examples of specific vehicle-based networks may include a local interconnect network (LIN), a controller area network (CAN), or a flex ray network. All may be applied specifically to automotive networks for the distribution of power and data within the automobile to various monitoring circuits or for the distribution and powering of entertainment devices, such as entertainment systems, video and audio entertainment systems often found in today's vehicles. Other networks may include a high speed data network, low speed data network, time-triggered communication on CAN (TTCAN) network, a J1939-compliant network, ISO11898-compliant network, an ISO11519-2-compliant network, as well as other similar networks. Other embodiments may supply power to network attached devices over alternative networks such as but not limited to a Home-PNA local area network and other similar networks. Home-PNA uses existing telephone wires to share a single network connection within a home or building. Alternatively, embodiments may be applied where network data signals are provided over power lines.

Non-magnetic transformer and choke power feed circuitry 262 and 266 enable elimination of magnetic transformers with integrated system solutions that enable an increase in system density by replacing magnetic transformers with solid state power feed circuitry in the form of an integrated circuit or discreet component.

In some embodiments, non-magnetic transformer and choke power feed circuitry 262, network physical layer 236, power distribution management circuitry 254, and power converter 238 may be integrated into a single integrated circuit rather than discrete components at the printed circuit board level. Optional protection and power conditioning circuitry may be used to interface the integrated circuit to the network connector 232.

The Ethernet PHY may support the 10/100/1000 Mbps data rate and other future data networks such as a 10000 Mbps Ethernet network. Non-magnetic transformer and choke power feed circuitry 262 supplies line power minus the insertion loss directly to power converter 238, converting power first to a 12V supply then subsequently to lower supply levels. The circuit may be implemented in any appropriate process, for example a 0.18 or 0.13 micron process or any suitable size process.

Non-magnetic transformer and choke power feed circuitry 262 may implement functions including IEEE 802.3.af signaling and load compliance, local unregulated supply generation with surge current protection, and signal transfer between the line and integrated Ethernet PHY. Since devices are directly connected to the line, the circuit may be implemented to withstand a secondary lightning surge.

For the power over Ethernet (PoE) to be IEEE 802.3af standard compliant, the PoE may be configured to accept power with various power feeding schemes and handle power polarity reversal. A rectifier, such as a diode bridge, a switching network, or other circuit, may be implemented to ensure power signals having an appropriate polarity are delivered to nodes of the power feed circuit. Any one of the conductors 1, 4, 7 or 3 of the network RJ45 connection can forward bias to deliver current and any one of the return diodes connected can forward bias to form a return current path via one of the remaining conductors. Conductors 2, 5, 8 and 4 are connected similarly.

Non-magnetic transformer and choke power feed circuitry 262 applied to PSE may take the form of a single or multiple port switch to supply power to single or multiple devices attached to the network. Power sourcing switch 270 may be operable to receive power and data signals and combine to communicate power signals which are then distributed via an attached network. If power sourcing switch 270 is a gateway or router, a high-speed uplink couples to a network such as an Ethernet network or other network. The data signal is relayed via network PHY 254 and supplied to non-magnetic transformer and choke power feed circuitry 266. PSE switch 270 may be attached to an AC power supply or other internal or external power supply to supply a power signal to be distributed to network-attached devices that couple to power sourcing switch 270. Power controller 256 within or coupled to non-magnetic transformer and choke power feed circuitry 266 may determine, in accordance with IEEE standard 802.3af, whether a network-attached device in the case of an Ethernet network-attached device is a device operable to receive power from power supply equipment. When determined that an IEEE 802.3af compliant powered device (PD) is attached to the network, power controller 256 may supply power from power supply to non-magnetic transformer and choke power feed circuitry 266, which is sent to the downstream network-attached device through network connectors, which in the case of the Ethernet network may be an RJ45 receptacle and cable.

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, component values, integrated circuit process variations, temperature variations, rise and fall times, and/or thermal noise. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, various aspects or portions of a network interface are described including several optional implementations for particular portions. Any suitable combination or permutation of the disclosed designs may be implemented.

What is claimed is:

1. An electronic apparatus comprising:
first and second Metal Oxide Semiconductor Field Effect Transistor (MOSFET) enhancement mode devices coupled respectively in series between first and second supply domains and coupled to respective first and second nodes; and
first and second active circuits coupled to gates of the respective first and second MOSFET enhancement mode devices and operative to close the respective device for a low current/voltage condition and open the respective device for large currents, wherein:
the first and second nodes are powered by respective first and second power supplies that are held in substantially independent isolation by the electronic apparatus whereby circuits referenced to the respective first and second supply domains are supplied with power constantly including during the transient event.

2. The apparatus according to claim 1 further comprising:
first and second circuits coupled across respective first and second MOSFET enhancement mode devices and configured whereby removal of a transient condition returns the short-circuit or low impedance connection between the first and second nodes and normal operation.

3. The apparatus according to claim 1 further comprising:
first and second resistors coupled across respective first and second MOSFET enhancement mode devices and configured whereby removal of a transient condition returns the short-circuit or low impedance connection between the first and second nodes and normal operation.

4. The apparatus according to claim 1 further comprising:
first and second control circuits configured to detect removal of a transient condition and return the short-circuit or low impedance connection between the first and second nodes and normal operation.

5. The apparatus according to claim 1 further comprising:
at least one shunt device coupled from a control terminal of the first and second MOSFET enhancement mode devices to the respective first and second nodes.

6. The apparatus according to claim 5 further comprising:
at least one shunt device coupled from a ground reference of the respective first and second supply domains to a control terminal of the first and second MOSFET enhancement mode devices to the respective first and second nodes.

7. The apparatus according to claim 6 further comprising:
the shunt devices comprising at least one device selected from a group of device consisting of a zener diode, an avalanche diode, a diode stack, a snapback metal oxide semiconductor field effect transistor (MOSFET), a Silicon-Controlled Rectifier (SCR) thyristor, and a transient suppressor circuit.

8. The apparatus according to claim 1 wherein:
the electronic apparatus is formed using a silicon-on-insulator process.

9. The apparatus according to claim 1 wherein:
the electronic apparatus is formed using a junction-isolated process.

10. The apparatus according to claim 1 wherein:
the electronic apparatus is configured to rapidly drive impedance between the first and second nodes high in response to the transient event and return to the short-circuit or low impedance connection between the first and second nodes when the transient event has ceased.

11. The apparatus according to claim 1 wherein:
the first and second nodes powered by respective first and second transient-isolated power supplies that are held mutually independent in transient isolation by a differential active clamp device that transfers power from the transient-isolated power supplies using a switched-capacitor circuit.

12. An apparatus comprising:
an active clamp device electrically coupling first and second nodes in respective first and second supply domains referenced to ground potentials that can be different, the active clamp device comprising first and second high voltage devices coupled in parallel to respective first and second low and/or medium voltage devices and controlled by signals respectively referenced to the first and second supply domains.

13. The apparatus according to claim 12 further comprising:
a controller coupled to the first and second high voltage devices and the first and second low and/or medium voltage devices and controlled by the signals respectively referenced to the first and second supply domains to create a short-circuit or low impedance connection between the first and second nodes in normal operation and increase impedance between the first and second nodes sufficiently to isolate against destructive transient energy in response to a transient event.

14. The apparatus according to claim 12 further comprising:
first and second comparators coupled to the respective first and second high voltage devices and coupled to the respective first and second low and/or medium voltage devices, the first and second comparators controlled by the signals respectively referenced to the first and second supply domains to create a short-circuit or low impedance connection between the first and second nodes in normal operation and increase impedance between the first and second nodes sufficiently to isolate against destructive transient energy in response to a transient event.

15. The apparatus according to claim 12 further comprising:
first and second resistors coupled across respective first and second high voltage devices and configured whereby removal of a transient condition returns the short-circuit or low impedance connection between the first and second nodes in normal operation.

16. The apparatus according to claim 12 further comprising:
at least one shunt device coupled to at least one of the first and second high voltage devices for shunting transient event energy to an earth ground reference.

17. The apparatus according to claim 16 further comprising:
the at least one shunt device comprising at least one device selected from a group of device consisting of a zener diode, an avalanche diode, a diode stack, a snapback metal oxide semiconductor field effect transistor (MOSFET), a Silicon-Controlled Rectifier (SCR) thyristor, and a transient suppressor circuit.

18. The apparatus according to claim 12 further comprising:
the active clamp device is formed using a silicon-on-insulator process or a junction isolated process.

19. The apparatus according to claim 12 further comprising:
the active clamp device configured to rapidly drive impedance between the first and second nodes high in response to the transient event and return to the short-circuit or low impedance connection between the first and second nodes when the transient event has ceased.

20. The apparatus according to claim 12 further comprising:
the first and second nodes powered by respective first and second power supplies that are held in substantially independent isolation by the active clamp device whereby circuits referenced to the respective first and second supply domains are supplied with power constantly including during the transient event.

21. The apparatus according to claim 12 further comprising:
the first and second nodes powered by respective first and second transient-isolated power supplies that are held mutually independent in transient isolation by a differential active clamp device that transfers power from the transient-isolated power supplies using a switched-capacitor circuit.

22. A transient event protection apparatus comprising:
a plurality of active devices coupled in series between an input terminal and an output terminal and configured to conduct current in opposite directions; and
first and second control elements respectively coupled to control the active devices that conduct current in opposite directions, the first and second control elements configured to create a short-circuit or low impedance connection between the input terminal and the output terminal in normal operation and increase impedance between the input terminal and the output terminal sufficiently to isolate against destructive transient energy in response to a transient event, wherein:
the input terminal is configured for coupling to an interface and the transient event protection apparatus is configured to protect the interface and devices and systems coupled to the interface by isolating against passing the destructive transient energy to the interface in response to the transient event.

23. The apparatus according to claim 22 further comprising:
a shunt coupled to the input terminal configured to respond during a transient event by forming a pathway for shunting transient energy to a low impedance path to an earth ground.

24. The apparatus according to claim 22 further comprising:
a plurality of shunts coupled in series to the input terminal configured to respond during a transient event by forming a pathway for shunting transient energy to a low impedance path to an earth ground.

25. The apparatus according to claim 22 wherein:
the input terminal is configured for coupling to an Ethernet Physical Layer (PHY) and the transient event protection apparatus is configured to protect the Ethernet PHY by isolating against passing the destructive transient energy to the Ethernet PHY in response to the transient event.

26. The apparatus according to claim 22 wherein:
the interface selected from a group consisting of a Universal Serial Bus (USB) interface, a RETMA standard (RS)-232 interface, a Transmission level 1 (T1) interface, and a communication interface.

27. The apparatus according to claim 22 wherein:
the active device plurality comprises first and second transistors coupled between the input terminal and the output terminal to conduct current in opposite directions; and
the first and second control elements are coupled to control terminals of the respective first and second transistors and controlled by signals respectively referenced to first and second supply domains.

28. The apparatus according to claim 22 wherein:
the active device plurality comprises first and second Metal Oxide Semiconductor Field-Effect Transistors (MOSFETs) coupled between the input terminal and the output terminal in a configuration that conducts current in opposite directions; and
respective first and second comparators are coupled to the control terminals of the respective first and second MOSFETs and configured to compare signals between the input terminal and the output terminal with a voltage referenced to respective first and second references.

29. A protection apparatus comprising:
at least one protection circuit coupling a plurality of input and output nodes and at least one ground reference, and comprising a plurality of active devices and at least one shunt device, the active device plurality coupled in parallel to respective first and second low and/or medium voltage devices and controlled by signals at the input and output node plurality that create a short-circuit or low impedance connection between the input and output node plurality in normal operation and increase impedance between the input and output node plurality to isolate against destructive transient energy in response to a transient event, the at least one shunt device configured to conduct transient currents associated with destructive transient energy to the at least one ground reference.

30. A transient protection method comprising:
electrically coupling first and second nodes in respective first and second supply domains;
referencing the first and second supply domains to ground potentials that can be different;
controlling impedance based on signals referenced to the first and second supply domains;
creating a short-circuit or low impedance connection between the first and second nodes in normal operation;
increasing impedance between the first and second nodes sufficiently to isolate against destructive transient energy in response to a transient event;
powering the first and second nodes by respective first and second power supplies that are held in substantially independent isolation; and
supplying the respective first and second supply domains with power constantly including during the transient event.

31. The method according to claim 30 further comprising:
rapidly driving impedance between the first and second nodes high in response to the transient event; and
returning to the short-circuit or low impedance connection between the first and second nodes when the transient event has ceased.

32. A transient event protection apparatus comprising:
at least two differential input terminals;
at least two differential output terminals;
a first protection circuit coupled between a first of the at least two differential input terminals and a first of the at least two differential output terminals;
a second protection circuit coupled between a second of the at least two differential input terminals and a second of the at least two differential output terminals;
a local supply coupled to power a first portion of the transient event protection apparatus relative to a local ground reference; and
a switched-capacitive circuit coupled to the first and second protection circuits and configured to create an independent supply that powers a second portion of the transient event protection apparatus relative to an associated independent ground reference.

33. The apparatus according to claim 32 further comprising:
a first resistance coupled between the local supply and the created independent supply;
a second resistance coupled between the local ground reference and the created independent ground reference; and
the switched capacitive circuit that transfers charge from the local supply between the first and second protection circuits whereby the independent supply is isolated from the local supply.

34. The apparatus according to claim 32 further comprising:
the switched capacitive circuit that isolates the independent supply from the local supply whereby energy in the second portion of the transient event protection apparatus oscillates in response to a transient event and is isolated from coupling to the first portion and the local supply.

35. The apparatus according to claim 32 further comprising:
the first and second protection circuits individually comprising first and second active devices coupled in series in a configuration to conduct current in opposite directions and controlled to create a short-circuit or low impedance connection between the first and second portions of the transient event protection apparatus in normal operation and increase impedance between the first and second portions sufficiently to isolate against destructive transient energy in response to a transient event.

36. The apparatus according to claim 32 further comprising:
a shunt coupled to at least one of the first and second protection circuits and configured to respond during a transient event by forming a pathway for shunting transient energy to a local ground.

37. A protection apparatus comprising:
at least one protection circuit coupling a plurality of input and output nodes and at least one ground reference, and comprising a plurality of switch means and at least one shunt means, the switch means coupled to the at least one protection circuit, configured to create an independent supply that powers a second portion of the protection apparatus relative to an associated independent ground reference, and responsive to signals at the input and output node plurality for creating a short-circuit or low impedance connection between the input and output node plurality in normal operation and for increasing impedance between the input and output node plurality for isolating against destructive transient energy in response to a transient event, the shunt means for conducting transient currents associated with destructive transient energy to the at least one ground reference.

38. A transient event protection apparatus comprising:
first and second active semiconductor devices coupled in series between an input terminal and an output terminal in a configuration to conduct current in opposite directions and controlled to create a short-circuit or low impedance connection between the input terminal and the output terminal in normal operation and increase impedance between the input terminal and the output terminal sufficiently to isolate against destructive transient energy in response to a transient event, wherein:
the input terminal is configured for coupling to an interface and the transient event protection apparatus is configured to protect the interface and devices and systems coupled to the interface by isolating against passing the destructive transient energy to the interface in response to the transient event.

39. The apparatus according to claim 38 further comprising:
a shunt coupled to the input terminal configured to respond during a transient event by forming a pathway for shunting transient energy to a local ground.

40. A transient event protection method comprising:
coupling first and second active semiconductor devices coupled in series between an input terminal and an output terminal;
configuring the first and second active semiconductor devices to conduct current in opposite directions;
controlling the first and second active semiconductor devices to create a short-circuit or low impedance connection between the input terminal and the output terminal in normal operation and increase impedance between the input terminal and the output terminal sufficiently to isolate against destructive transient energy in response to a transient event;

configuring the input terminal for coupling to an interface; and configuring the transient event protection apparatus to protect the interface and devices and systems coupled to the interface by isolating against passing the destructive transient energy to the interface in response to the transient event.

41. The method according to claim 40 further comprising:
coupling a shunt to the input terminal; and
configuring the shunt to respond during a transient event by forming a pathway for shunting transient energy to a local ground.

42. An electronic apparatus comprising:
first and second Metal Oxide Semiconductor Field Effect Transistor (MOSFET) depletion mode devices coupled respectively in series between first and second supply domains and coupled to respective first and second nodes; and
first and second active circuits coupled to gates of the respective first and second MOSFET depletion mode devices and operative to close the respective device for a low current/voltage condition and open the respective device for large currents, wherein:
the first and second nodes are powered by respective first and second power supplies that are held in substantially independent isolation by the electronic apparatus whereby circuits referenced to the respective first and second supply domains are supplied with power constantly including during the large currents.

43. An electronic apparatus comprising:
first and second Junction Field Effect Transistor (JFET) devices coupled respectively in series between first and second supply domains and coupled to respective first and second nodes; and
first and second active circuits coupled to gates of the respective first and second JFET devices and operative to close the respective device for a low current/voltage condition and open the respective device for large currents, wherein:
the first and second nodes are powered by respective first and second power supplies that are held in substantially independent isolation by the electronic apparatus whereby circuits referenced to the respective first and second supply domains are supplied with power constantly including during the large currents.

44. A protection apparatus comprising:
at least one protection circuit coupling a plurality of input and output nodes, and comprising a plurality of active devices, the active device plurality coupled in parallel to respective first and second low and/or medium voltage devices and controlled by signals at the input and output node plurality that create a short-circuit or low impedance connection between the input and output node plurality in normal operation and increase impedance between the input and output node plurality to isolate either a first node or a second node from either transient or short-circuit events, the impedance increase being sufficient to create a short circuit between the first and second node, preventing damage of a driving device on the isolated node.

45. The protection apparatus according to claim 44 further comprising:
the active device plurality configured whereby the impedance increase prevents an interaction of a transient event at the first node with circuits on the second node.

46. A protection apparatus comprising:
at least one protection circuit coupling a plurality of input and output nodes, and comprising a plurality of active devices, the active device plurality coupled in parallel to respective first and second low and/or medium voltage devices and controlled by signals at the input and output node plurality that create a short-circuit or low impedance connection between the input and output node plurality in normal operation and increase impedance between the input and output node plurality to isolate either a first node or a second node from either transient or short-circuit events, the impedance increase being sufficient to create a high impedance to high currents whereby effects outside a range of normal current level are prevented.

47. The protection apparatus according to claim 46 further comprising:
the active device plurality configured whereby the impedance increase prevents an interaction of a transient event at the first node with circuits on the second node.

48. An electronic apparatus comprising:
an active clamp device electrically coupling first and second nodes in respective first and second supply domains coupled through low impedance to separate ground potentials, the active clamp device comprising first and second active devices coupled in parallel to respective first and second low and/or medium voltage devices and controlled by signals respectively referenced to the first and second supply domains that create a short-circuit or low impedance connection between the first and second nodes in normal operation and increase impedance between the first and second nodes sufficiently to isolate against destructive transient energy in response to a transient event.

* * * * *